(12) United States Patent
Quamar et al.

(10) Patent No.: US 12,153,631 B2
(45) Date of Patent: Nov. 26, 2024

(54) CONVERSATION BASED DATA ANALYSIS RECOMMENDATIONS

(71) Applicant: International Business Machines Corporation, Armonk, NY (US)

(72) Inventors: Abdul Quamar, San Jose, CA (US); Fatma Ozcan, San Jose, CA (US); Eser Kandogan, Mountain View, CA (US); Jung-Lin Lee, El Dorado Hills, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 794 days.

(21) Appl. No.: 17/160,630

(22) Filed: Jan. 28, 2021

(65) Prior Publication Data
US 2022/0237232 A1 Jul. 28, 2022

(51) Int. Cl.
| | |
|---|---|
| *G06F 16/9032* | (2019.01) |
| *G06F 16/242* | (2019.01) |
| *G06F 16/2452* | (2019.01) |
| *G06F 16/2458* | (2019.01) |
| *G06F 16/248* | (2019.01) |
| *G06F 16/26* | (2019.01) |
| *G06F 16/9035* | (2019.01) |
| *G06F 40/216* | (2020.01) |
| *G06F 40/284* | (2020.01) |
| *G06F 40/30* | (2020.01) |
| *G06N 5/02* | (2023.01) |

(52) U.S. Cl.
CPC .... *G06F 16/90332* (2019.01); *G06F 16/2425* (2019.01); *G06F 16/243* (2019.01); *G06F 16/24522* (2019.01); *G06F 16/2465* (2019.01); *G06F 16/248* (2019.01); *G06F 16/26* (2019.01); *G06F 16/90324* (2019.01); *G06F 16/9035* (2019.01); *G06F 40/216* (2020.01); *G06F 40/284* (2020.01); *G06F 40/30* (2020.01); *G06N 5/02* (2013.01)

(58) Field of Classification Search
None
See application file for complete search history.

(56) References Cited

U.S. PATENT DOCUMENTS 10,067,987 B1 * 9/2018 Khanna .................. G06F 16/44
10,403,273 B2 9/2019 Lee et al.
(Continued)

*Primary Examiner* — Richa Sonifrank
(74) *Attorney, Agent, or Firm* — Garg Law Firm, PLLC; Rakesh Garg; James Olsen

(57) ABSTRACT

An insight comprising a fact about a portion of data in a dataset is detected in the dataset. A context is determined by analyzing a natural language input, the context identifying an intent and an entity referenced by the natural language input. A relevance score is computed for the insight, the relevance score comprising a measure of similarity between a vector representation of the insight and a vector representation of the context, the vector representation of the insight comprising an encoding of the insight in multidimensional numerical form, the vector representation of the context comprising an encoding of the context in multidimensional numerical form. A selected insight is presented, the selected insight selected from a set of insights including the insight, the selected insight selected based on the relevance score.

21 Claims, 20 Drawing Sheets

(56) References Cited

U.S. PATENT DOCUMENTS

| | | | |
|---|---|---|---|
| 10,943,072 B1* | 3/2021 | Jaganmohan | G06N 5/041 |
| 2018/0196881 A1* | 7/2018 | Lundin | G06F 16/9535 |
| 2019/0130281 A1* | 5/2019 | Yang | G06N 3/044 |
| 2019/0147346 A1* | 5/2019 | Reicher | G16H 50/20 |
| | | | 706/11 |
| 2020/0143247 A1 | 5/2020 | Jonnalagadda et al. | |
| 2020/0210647 A1* | 7/2020 | Panuganty | G06N 3/08 |
| 2020/0312300 A1* | 10/2020 | Yan | G10L 15/063 |
| 2022/0147934 A1* | 5/2022 | Chandrashekar | G06F 40/20 |
| 2022/0179882 A1* | 6/2022 | Cervantes | G06N 5/025 |
| 2022/0263877 A1* | 8/2022 | Conlin | H04L 65/4015 |

\* cited by examiner

CONVERSATION BASED DATA ANALYSIS RECOMMENDATIONS

BACKGROUND

The present invention relates generally to a method, system, and computer program product for data analysis recommendations. More particularly, the present invention relates to a method, system, and computer program product for conversation based data analysis recommendations.

Natural language interfaces are rapidly gaining popularity as a means to democratize access to data-driven insights across different knowledge domains and business organizations. Natural language interfaces support a wide range of user types, particularly non-technical user types, in exploring data, investigating various performance indicators, and deriving valuable business insights without relying on technical expertise provided by others. Some natural language interfaces are one-shot question and answer systems where a user formulates a query in natural language and the interface responds with query-appropriate results. Other natural language interfaces are conversational systems that understand natural language queries and interact with a user over multiple turns of conversation while maintaining a conversational context between queries. Thus, for example, if a user first asks, "Tell me about yearly sales", the system responds with yearly sales data, and the user then asks, "Ok, now break those out by product line," the system understands that "those" refers to the yearly sales data previous provided.

A natural language interface or conversational system is a computer-implemented system that interacts, using natural language, with a human user. Conversational systems typically use text, speech, graphics, haptics, gestures, and other communication modes for both input and output. A conversational turn is one cycle of a user input, for example a query, followed by a system response. Note that a user input is often called a query even if not phrased as a question. For example, a conversational system considers a user input of "show me data about sales" as a query about sales data, even though the input is phrased as a statement rather than a question.

The illustrative embodiments recognize that natural language interface users often struggle to figure out specific questions to ask in order to get valuable insights. For example, in business intelligence applications users often have to go through a tedious process of multiple cycles of exploratory analysis queries followed by drill down and roll up operations in order to gain any meaningful insights. In addition, natural language interfaces for exploring data are often user driven, limiting the conversational interaction to a fixed set of patterns and relying on a user to initiate the correct request and specify parameters to generate an appropriate response. Although such request-based systems work well for transactional tasks within the fixed set of patterns, feedback to the user and guidance in exploring the data are crucial for tasks outside the fixed set of patterns, when a user is unfamiliar with the data or patterns, or in other more open-ended knowledge-oriented or informational tasks such as exploratory data analysis.

The illustrative embodiments also recognize that recommendation systems, providing analysis recommendations based on data-driven insights, can guide a user through data exploration. For example, systems that rank and score different recommendations based on particular metrics are available. However, currently available recommendation systems have been integrated only with one-shot question and answer systems or systems that do not maintain conversational context across more than one query and answer cycle. In addition, currently available recommendation systems lack feedback to a user regarding how the system is interpreting a user query and what questions a user can ask.

Thus, the illustrative embodiments recognize that there is an unmet need for natural language conversation based data analysis recommendations that maintain conversational context across multiple query and answer cycles and guide users' analysis by suggesting possible follow-up queries based on the current conversational context.

SUMMARY

The illustrative embodiments provide a method, system, and computer program product. An embodiment includes a method that detects, in a dataset, an insight, the insight comprising a fact about a portion of data in the dataset. An embodiment determines, by analyzing a natural language input, a context, the context identifying an intent and an entity referenced by the natural language input. An embodiment computes, for the insight, a relevance score, the relevance score comprising a measure of similarity between a vector representation of the insight and a vector representation of the context, the vector representation of the insight comprising an encoding of the insight in multidimensional numerical form, the vector representation of the context comprising an encoding of the context in multidimensional numerical form. An embodiment presents a selected insight, the selected insight selected from a set of insights including the insight, the selected insight selected based on the relevance score. Thus, the embodiment provides a method for conversation based data analysis recommendation.

Another embodiment further includes a method that determines, by analyzing a second natural language input, an updated context. The embodiment detects, responsive to determining that the updated context has below a threshold similarity with the context, a second insight. The embodiment computes, for the second insight, a second relevance score. The embodiment presents a second selected insight, the second selected insight selected from a second set of insights including the second insight, the second selected insight selected based on the second relevance score. Thus, the embodiment provides a method for updated conversation based data analysis recommendation based on an updated context.

Another embodiment further includes a method that computes, for the insight, an interestingness score. The embodiment computes, for the insight, a timeliness score. The embodiment combines, into an insight score, the interestingness score, the relevance score, and the timeliness score. Thus, the embodiment provides a method that scores an insight using a combination of the interestingness score, the relevance score, and the timeliness score.

In another embodiment, the selected insight is selected based on the insight score. Thus, the embodiment selects an insight for recommendation based on the insight score.

In another embodiment, the insight score comprises a weighted average of the interestingness score, the relevance score, and the timeliness score. Thus, the embodiment provides a formula for computation of the insight score.

In another embodiment, the vector representation of the insight and the vector representation of the context are computed using an encoding scheme. Thus, the embodiment provides further detail of computing the vector representations of the insight and context.

In another embodiment, the encoding scheme is a one-hot encoding scheme. Thus, the embodiment provides further detail of the encoding scheme.

In another embodiment, the encoding scheme encodes an attribute of the insight and an equivalent attribute of the context using the same vector dimension. Thus, the embodiment provides further detail of the encoding scheme.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

An embodiment includes a data processing environment. The data processing environment includes one or more processors, one or more computer-readable memories, and one or more computer-readable storage devices, and program instructions stored on at least one of the one or more storage devices for execution by at least one of the one or more processors via at least one of the one or more memories.

An embodiment includes a natural language processing system. The natural language processing system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
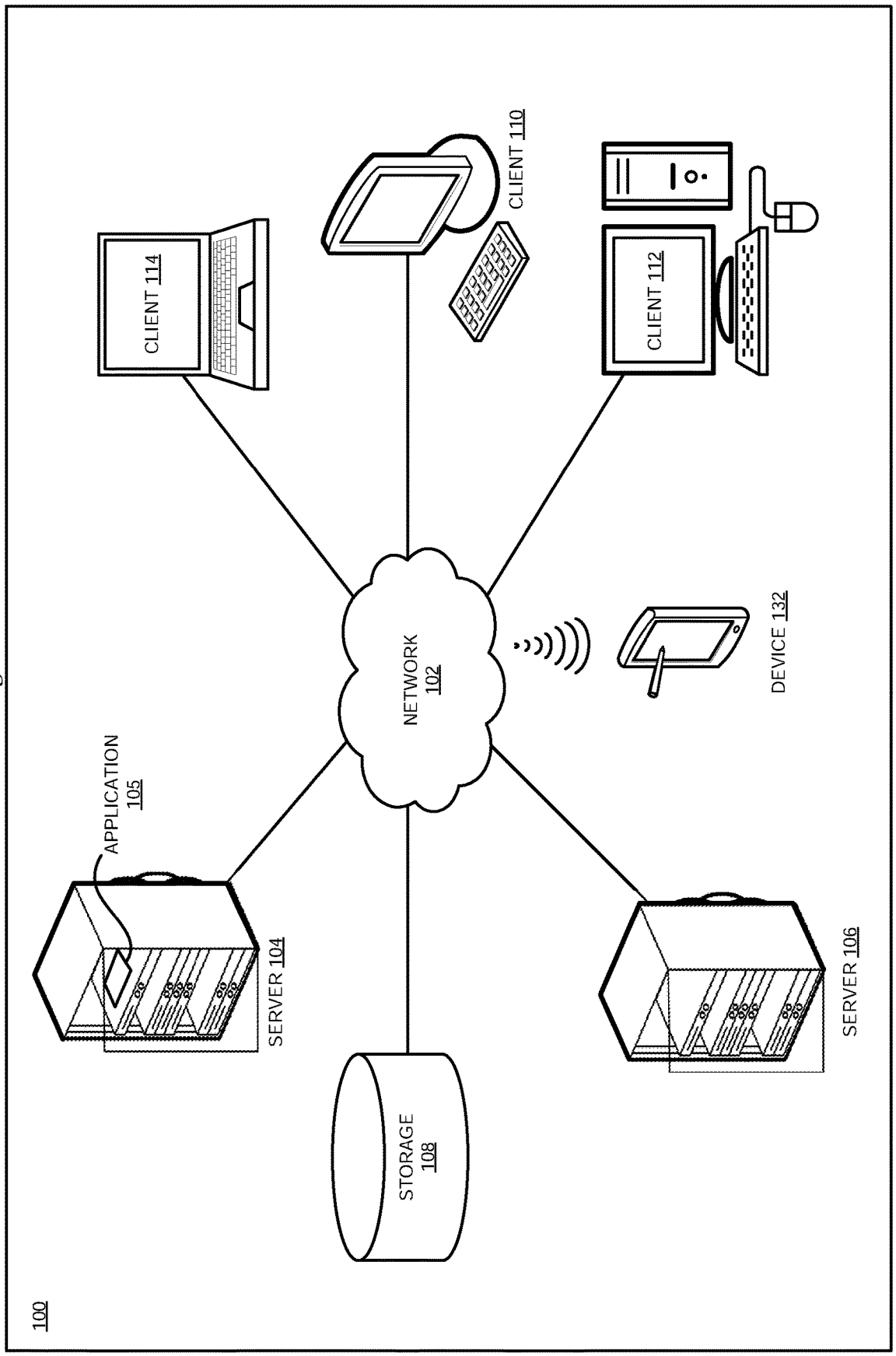
FIG. 1 depicts a block diagram of a network of data processing systems in which illustrative embodiments may be implemented.

The illustrative embodiments recognize that there is an unmet need for natural language conversation based data analysis recommendations that maintain conversational context across multiple query and answer cycles and guide users' analysis by suggesting possible follow-up queries based on the current conversational context. The illustrative embodiments recognize that the presently available tools or solutions do not address these needs or provide adequate solutions for these needs. The illustrative embodiments used to describe the invention generally address and solve the above-described problems and other problems related to conversation based data analysis recommendations.

An embodiment can be implemented as a software application. The application implementing an embodiment can be configured as a modification of an existing natural language conversation or data analysis recommendation system, as a separate application that operates in conjunction with an existing natural language conversation or data analysis recommendation system, a standalone application, or some combination thereof.

Particularly, some illustrative embodiments provide a method that detects an insight in a dataset, determines a context by analyzing a natural language input, computes a score based on a measure of similarity between the insight and context, and presents an insight selected based on the insight's score to a user.

An embodiment uses a presently available conversation service to interact with a user via a user interface. The conversation service receives user input, typically in natural language form. If the user input is not already in text form, the conversation service converts the input to text form. The conversation service analyzes user input to identify one or more intents and entities within the user input. An intent is a goal or action expressed in the user input. An entity represents information relevant to the user's purpose and available in a dataset to which an embodiment has access. For example, in the user input "show me last year's sales data" an intent is a data request and an entity is sales data for the year prior to the current year. Together, entities and intents comprise a conversational context, or simply context. Context includes entities and intents expressed in the most recent user input, as well as those expressed in previous user inputs that remain relevant. Users often implicitly reference previous inputs in conversational interactions. For example, if after the user input "show me last year's sales data" the next user input is "break out that data by product type", the conversational system understands that "that data" refers to sales data for the year prior to the current year. An embodiment also outputs one or more dialogues to the conversation service. A dialogue is data with which to respond to a user based on intents, entities, and the current conversational context. The conversation service uses dialogues to output a response to a user in any suitable form, such as voice or a graphical representation of data. Some presently available conversation services are cloud-based services, while others are co-located with an embodiment.

An embodiment interfaces with a presently available conversation service. In particular, an embodiment receives intents, entities, and context from the conversation service, triggers other portions of the embodiment to generate data responding to the intents, entities, and context, and provides that data to the conversation service in a dialogue. One embodiment maintains intents, entities, and context in a structured format, for example a nested JavaScript Object Notation (JSON) format. JSON is a text-only structured format, commonly used for data interchange, that is supported by many programming languages.

An embodiment uses an intent and associated context to generate a structured query, with one or more entities as input parameters. The embodiment uses a presently available method to generate data responsive to the query. One embodiment performs data filtering and statistical data analysis on data in a dataset in response to data filtering and statistical data analysis queries. Another embodiment forwards a query to an external presently available analytical platform, which generates responsive data and provides that data to the embodiment. Another embodiment interfaces with multiple data analysis modules, each providing a particular type of analysis in response to a particular type of query.

An embodiment includes one or more recommender modules. Each recommender module generates a particular type of insight. An insight represents a single fact about a portion of data. Some recommender modules analyze a dataset to compute statistical measures of data within the dataset and report statistical measures that are more than an amount or percentage different from a threshold. One embodiment includes a correlation module, which iterates through pairs of types of data (representing possible scatterplots that can be generated from the data), then computes a correlation measure between pairs. A correlation measure that is higher than a threshold amount is reported as an insight. For example, a correlation module might produce an insight that sales have above a threshold amount of correlation with profits for a particular product. One embodiment includes a deviation module, which computes deviations of some types of data from other types of data and reports as insights deviations that are above a threshold deviation. For example, a deviation module might produce an insight that the unit price of one particular product is 6 standard deviations higher than the average of all unit prices. One embodiment includes an outlier module, which computes outlier data points as insights. One embodiment includes a skewness module, which computes skewness (the asymmetry of a probability distribution about a mean) and reports skewness above a threshold value as an insight. One embodiment includes a kurtosis module, which computes kurtosis (a measure of how much the tails of a particular distribution differ from the tails of a normal distribution) and reports kurtosis above a threshold value as an insight. One embodiment includes a variance module, which computes variance (the squared deviation of a random variable from its mean) and reports variance above a threshold value as an insight. One embodiment includes a monotonicity module, which reports types of data that increase or decrease together. Other embodiments include recommender modules that compute different statistical insights and recommender modules that compute insights that are not statistical measures. Implementing recommenders in a modular manner allows an embodiment to be configured according to the type of data stored in a dataset and available for presentation to a user. In addition, because different analyses require different amounts of time to complete and because analyses relate only to data in the dataset, recommender modules generate insights asynchronously with particular user queries. An embodiment manages and stores insights generated by the recommender modules for evaluation for presentation to a user. An embodiment maintains insight data in a structured format, for example a nested JSON format, for ease in processing insights from different recommender modules.

An embodiment selects one or more insights for evaluation for presentation to a user during a conversation. Useful insights report something interesting about data in a dataset, are relevant to a user's conversational context, and should be shown at particular points within a conversation without too much repetition. Interestingness is a measure of how interesting an insight is. Relevance is a measure of how closely an insight matches what a user is talking about. However, there is often a tradeoff between interestingness and relevance: selecting only insights with very high relevance scores can eliminate insights from potentially tangential lines of inquiry that might be very interesting, while selecting an insight that is very interesting but not very relevant could be distracting or annoying to a user. Timeliness avoids showing a user the same insights at every turn in a conversation, even if the insights remain sufficiently relevant and interesting, by gradually phasing out insights a user has previously seen. Thus, to select insights, an embodiment scores insights according to one or more of their interestingness, relevance, and timeliness.

For a recommender module that computes a statistical measure of data within the dataset, an embodiment computes an interestingness score corresponding to the statistical measure, normalized to a common scale (e.g. 0 to 1) for comparison with other insights from other recommender modules. For example, the correlation module iterates through pairs of types of data computing insights—correlation measures between pairs that are higher than a threshold value—and computes an interestingness score for an insight by normalizing the correlation measure to a common scale.

For a recommender modules that computes other than statistical measures, an embodiment computes an interestingness score appropriate to the recommender module's analysis.

An embodiment computes a relevance score for an insight by comparing an insight to the current conversational context. For example, if a user was asking about sales data, insights involving sales data are more relevant than insights involving other kinds of data such as net profit or margin data. In addition, representing a user's state of data exploration in the context allows specification, using the context, of multiple attributes of interest, reducing the combinatorial search space of recommendations and increasing system performance. For example, if a user was asking about sales data, insights involving data that is not sales data, such as the cost of materials in a product, might be removed from the recommendation search space.

To facilitate comparing an insight to the current conversational context, an embodiment encodes both insight and context using the same format. In one embodiment, the format is a vector representation. A vector representation represents data in a multidimensional numerical form. A vector representation is also called an embedding.

In one embodiment, the encoding scheme encodes vocabulary terms used in either insight or context. Each vocabulary term is a combination of a field (e.g. a task or a data attribute) and available options for values of that field (e.g. aggregation or correlation for task and profit or sales for a data attribute). One embodiment uses a one-hot encoding scheme, in which every option of a field is represented by a dimension of a vector. To encode a particular value of a field, the dimension corresponding to that value is set to a particular value (e.g., one) and the dimensions corresponding to other possible values are set to zero. Thus, for example, if a field denoting the stage of a user's data exploration has three possible values, early, middle, and late, to encode a value of early the dimension corresponding to early is set to one and the dimensions corresponding to middle and late are set to zero.

Insight and context are encoded using the same format or encoding scheme, in which contexts and insights with similar attributes are represented by vectors that are close together in the vector space, while contexts and insights with less similar attributes are represented by vectors that are further apart in the vector space. The vector format of the encoding scheme is also configurable to prioritize some attributes over others.

In one embodiment's encoding scheme, if a particular field value has an equivalent meaning in both an insight and a context, the field value is encoded in the same vector dimension. For example, if unit_cost is a possible value of the attribute field, then both an insight and a context that include the unit_cost value for the attribute field will have a one in the same vector dimension. In cases in which a particular field value does not have an equivalent meaning in both an insight and a context, linkages between field values can also be implemented in the encoding by assigning linked field values to the same vector dimension. For example, to present easy to understand insights to a user in an early stage of data exploration, the context term stage_early is assigned a common vector dimension with the insight term difficulty_level_easy. Multiple field values can also be implemented in the encoding in a similar manner to encode one-to-many linkages between field values. In one embodiment, a subject matter expert determines which field values have equivalent meanings and which field values should be linked in a system configuration process.

In one embodiment's encoding scheme, each field value is equally weighted by setting each corresponding dimension's value to either one or zero. In another embodiment's encoding scheme, varying importance of particular fields and field values are denoted by setting each corresponding dimension's value one or zero as well as other values. For example, if the attribute field is to be given more weight than other fields, vector dimensions corresponding to values for the attribute field might be set to two, while vector dimensions corresponding to values for other fields might be set to one.

Another embodiment uses a machine learning model to compute vector representations of insights and contexts. The machine learning model is trained to compute vector representations using a set of training data, for example training data in which an insight and a context are labelled as similar to or different from each other. Another embodiment computes vector representations of insights and context using a presently-available word embedding, sentence embedding, or graph embedding technique. Word embedding techniques generate a vector representation for each word, or each important word, in an input. Sentence embedding techniques generate a vector representation for each sentence or other word grouping in an input. Graph embedding techniques generate a vector representation for graph or portion of a graph representing a portion of an input and relations between portions of an input. Another embodiment uses another technique to compute similarity of an insight and a context.

To compute a relevance score, an embodiment computes a similarity measure between an encoded version of a context and an encoded version of an insight. In one embodiment in which both context and insight are encoded into vector representations, the similarity measure is cosine similarity between the two vector representations. Cosine similarity is a measure of similarity between two non-zero vectors, and is equal to the cosine of the angle between the two vectors. Other techniques for measuring similarity between vector representations, and between encodings that are not vector representations, are also possible and are contemplated within the scope of the illustrative embodiments.

An embodiment computes a timeliness score for an insight. Computing a timeliness score that decreases as an interaction with a user proceeds avoids showing a user the same insights at every turn in a conversation, even if the insights remain sufficiently relevant and interesting. One embodiment computes a timeliness score of an insight by computing 1−frequency(I)/current timestep, where frequency(I) represents the frequency with which an insight I was shown to a user in previous conversational turns and the current timestep represents the current conversational turn. For example, if this is conversation turn 3, an insight that was presented to a user in the last two conversational turns has frequency(I)=3 and the corresponding timeliness score is 1−3/3=0. However, if this is conversation turn 3 and the insight was not presented in the last two conversational turns, frequency(I)=1 and the corresponding timeliness score is 1−1/3=2/3. Thus, the insight which has not been previously presented has a higher timeliness score than the insight that has already been presented twice. Other techniques for computing a timeliness score are also possible and contemplated within the scope of the illustrative embodiments.

An embodiment combines one or more of an insight's interestingness, relevance, and timeliness scores into a composite insight score. One embodiment computes a weighted average of the interestingness, relevance, and timeliness scores. In one embodiment, the weights of each score are constant. In another embodiment, the weights of each score are adjusted as an interaction with a user progresses. For example, when a user is at a beginning analysis stage and might be interested in exploring different aspects of the data in a dataset, the interestingness of an insight might be prioritized over relevance by weighting an insight's interestingness score higher than the insight's relevance score. As another example, when a user is at a later analysis stage and might be interested in analyzing specific data, the relevance of an insight might be prioritized over interestingness by weighting an insight's relevance score higher than the insight's interestingness score. Other techniques for weight adjustment and for combining one or more of an insight's interestingness, relevance, and timeliness scores into a composite insight score are also possible and contemplated within the scope of the illustrative embodiments.

An embodiment uses an insight's composite score to select one or more insights for presentation to a user, as recommendations for analyses a user might be interested in pursuing. One embodiment ranks all scored insights, and selects a predetermined number of the top-ranked insights for presentation. Another embodiment ranks all the insights with scores above a predetermined threshold score and selects a predetermined number of the top-ranked insights for presentation. Another embodiment adjusts the number of insights to be presented according to a configuration setting. Another embodiment adjusts the number of insights to be presented according to a stage of the user's interaction (e.g. more insights early in the user's interaction and fewer insights later in the user's interaction when the user is assumed to be more familiar with the dataset and available analyses). Another embodiment adjusts the number of insights to be presented according to feedback from the user (e.g. show more insights if the user selects one or more of the insights for further analysis, show fewer insights if the user ignores the insights or asks the system to stop showing insights). An embodiment provides data of any selected insights, as dialogue or other data, to a conversation service for communication with a user.

Recommender modules generate insights asynchronously with particular user queries. As a result, generated insights should be updated when data used to generate insights changes sufficiently to affect insights that have already been generated. One embodiment triggers updates to insight generation when a portion of data in the dataset is updated. Another embodiment triggers updates to insight generation when the size or frequency of dataset updates is above a threshold side or frequency. Some data updates can affect different insights differently. For example, a particular data update might affect outlier-based insights but not correlation-based insights. As another example, more data updates might be needed to affect correlation-based insights than deviation-based insights. As a result, another embodiment triggers updates to insight generation using different thresholds for different recommender modules.

One embodiment generates insights using a subset of relevant data within a dataset. Limiting insights to relevant data, particularly within a larger dataset, improves system performance by generating insights on data a user is currently interested in. For example, if during a conversation a user filters data to include only US sales transaction, insights relevant to US sales transactions are generated and insights that relate only to non-US sales transactions are not generated. Limiting insights to relevant data also identifies insights based on data distributions that are only apparent at different levels of data granularity or dimension hierarchy. For example, analyzing aggregated sales data by year might yield one set of insights, while analyzing one particular year's sales by product type might reveal that only one product sold well that year while sales of other products declined. Thus, an embodiment triggers updates to insight generation when the current conversational context has below a threshold similarity with a previous conversational context. One embodiment triggers updates to insight generation using different thresholds for different recommender modules.

The manner of conversation based data analysis recommendations described herein is unavailable in the presently available methods in the technological field of endeavor pertaining to conversation systems and recommendation systems. A method of an embodiment described herein, when implemented to execute on a device or data processing system, comprises substantial advancement of the functionality of that device or data processing system in detecting an insight in a dataset, determining a context by analyzing a natural language input, computing a score based on a measure of similarity between the insight and context, and presenting an insight selected based on the insight's score to a user.

The illustrative embodiments are described with respect to certain types of insights, contexts, data analyses, encoding schemes, vector representations, user interfaces, conversational systems, thresholds, rankings, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
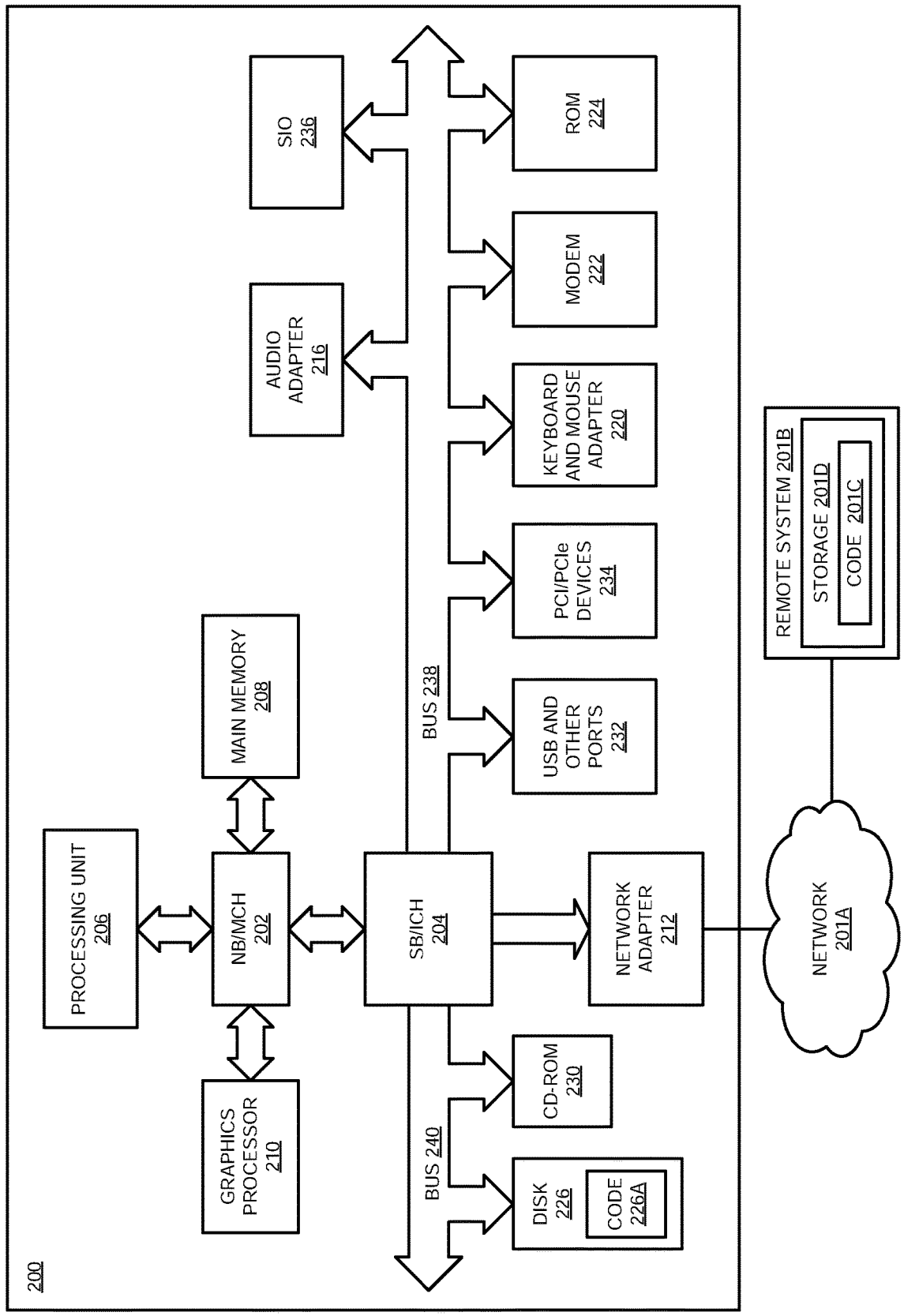
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. In addition, application 105 can execute in one system (e.g. any of servers 104 and 106, clients 110, 112, and 114) while using the services of a conversational system executing in another system (e.g. device 132) to interact with a user.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
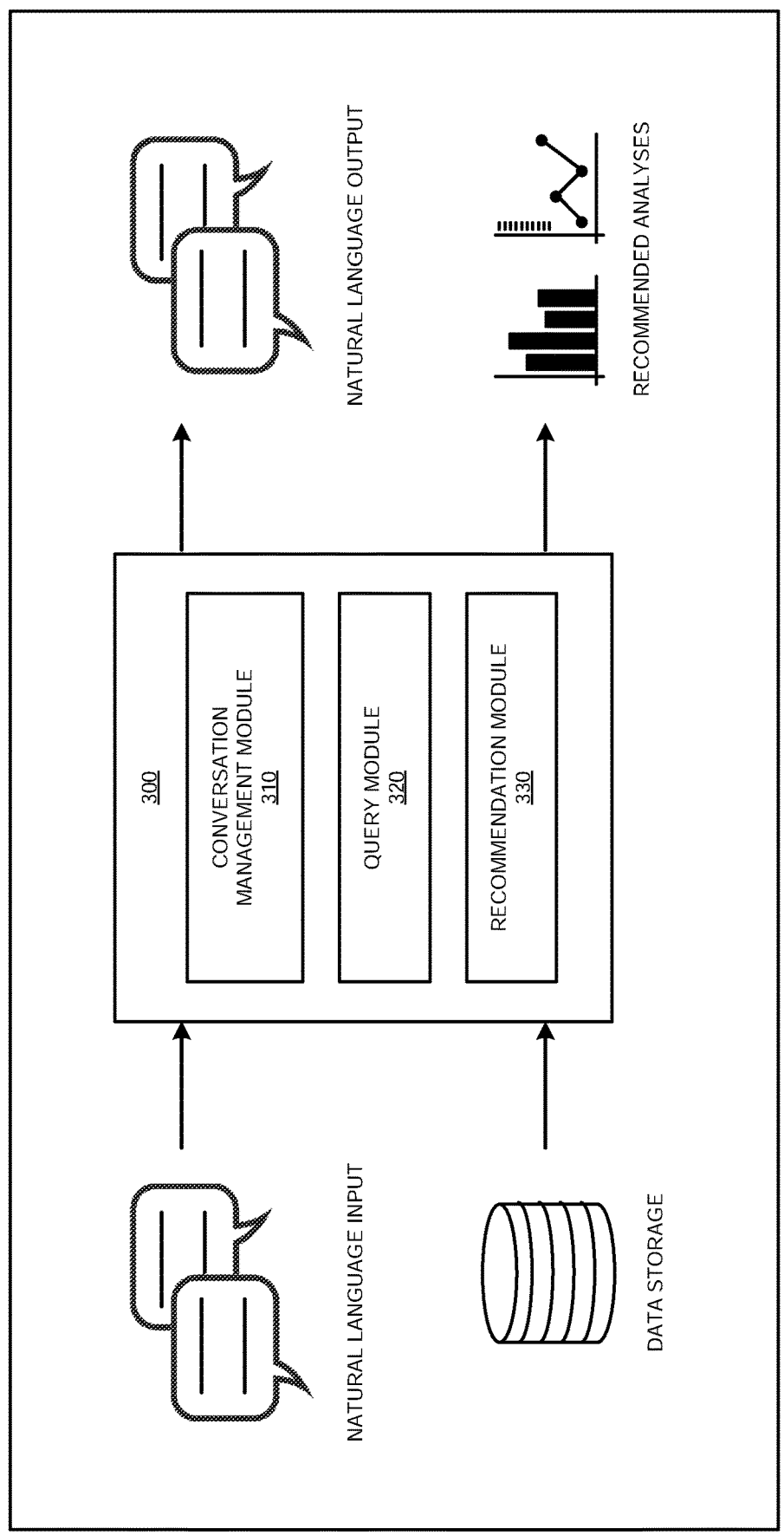
FIG. 3 depicts a block diagram of an example configuration for conversation based data analysis recommendations in accordance with an illustrative embodiment.

With reference to FIG. 3, this figure depicts a block diagram of an example configuration for conversation based data analysis recommendations in accordance with an illustrative embodiment. Application 300 is an example of application 105 in FIG. 1 and executes in any of servers 104 and 106, clients 110, 112, and 114, and device 132 in FIG. 1.

Conversation management module 310 uses a presently available conversation service to interact with a user via a user interface. The conversation service receives user input, typically in natural language form. If the user input is not already in text form, the conversation service converts the input to text form. The conversation service analyzes user input to identify one or more intents and entities within the user input. Module 310 also outputs one or more dialogues to the conversation service. The conversation service uses dialogues to output a response to a user in any suitable form, such as voice or a graphical representation of data. Thus, module 310 receives intents, entities, and context from the conversation service, triggers other portions of application 300 to generate data responding to the intents, entities, and context, and provides that data to the conversation service in a dialogue. One implementation of module 310 maintains intents, entities, and context in a structured format, for example a nested JSON format.

Query module 320 uses an intent and associated context to generate a structured query, with one or more entities as input parameters. Module 320 uses a presently available method to generate data responsive to the query. One implementation of module 320 performs data filtering and statistical data analysis on data in a dataset in response to data filtering and statistical data analysis queries. Another implementation of module 320 forwards a query to an external presently available analytical platform, which generates responsive data and provides that data to the embodiment. Another implementation of module 320 interfaces with multiple data analysis modules, each providing a particular type of analysis in response to a particular type of query.

Recommendation module 330 manages one or more recommender modules. Each recommender module generates a particular type of insight. Module 330 selects one or more insights for evaluation for presentation to a user during a conversation, triggers updates to insight generation, and provides data of any selected insights, as dialogue or other data, to module 310 for communication with a user. More detail of module 330 is provided with reference to FIG. 4.

Figure 4:
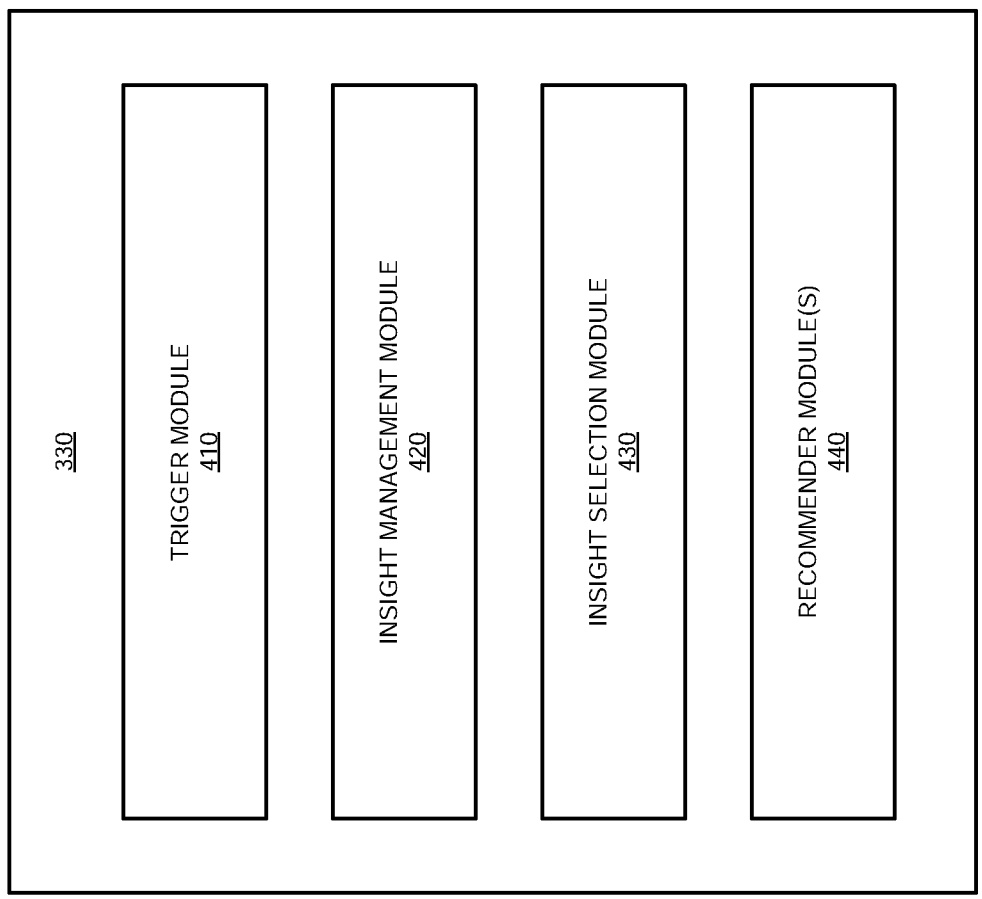
FIG. 4 depicts a block diagram of an example configuration for conversation based data analysis recommendations in accordance with an illustrative embodiment.

With reference to FIG. 4, this figure depicts a block diagram of an example configuration for conversation based data analysis recommendations in accordance with an illustrative embodiment. In particular, FIG. 4 depicts more detail of recommendation module 330 in FIG. 3.

Figure 8:
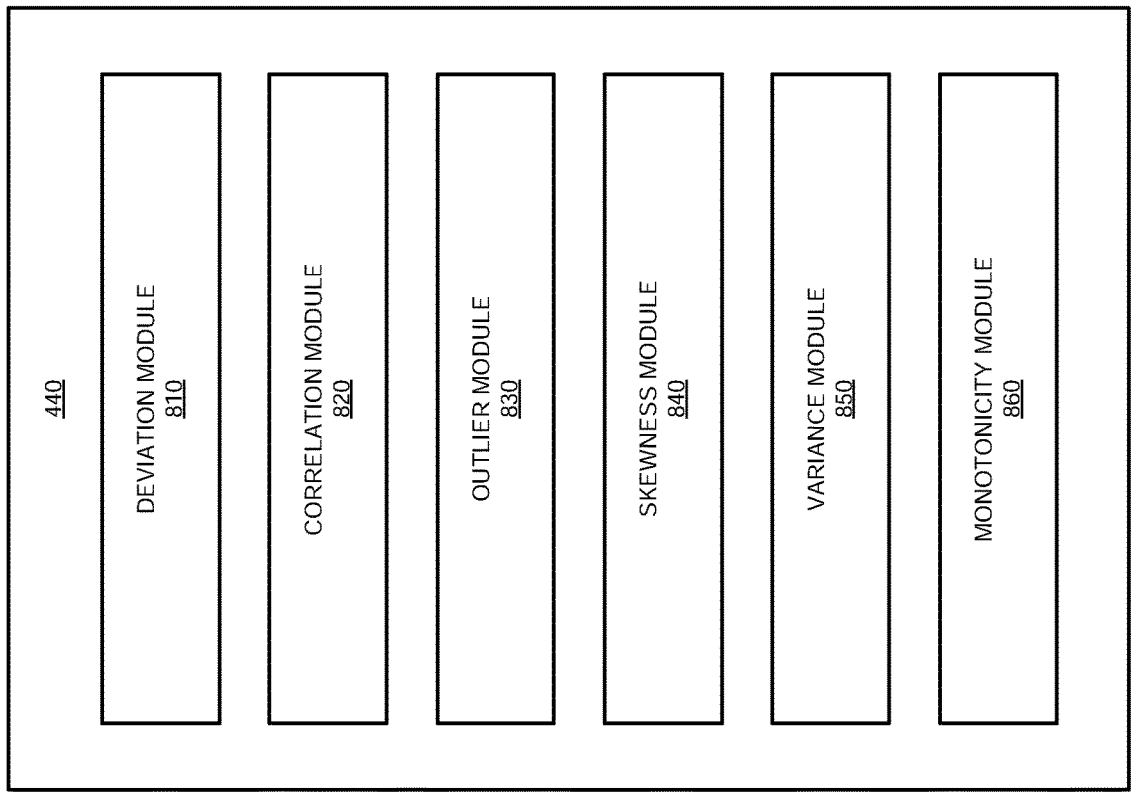
FIG. 8 depicts a block diagram of an example configuration for conversation based data analysis recommendations in accordance with an illustrative embodiment.

Module 330 includes one or more recommender modules 440. Each recommender module 440 generates a particular type of insight. Some recommender modules 440 analyze a dataset to compute statistical measures of data within the dataset and report statistical measures that are more than an amount or percentage different from a threshold. FIG. 8 depicts more detail of one implementation of recommender modules 440. Other implementations include recommender modules 440 that compute different statistical insights and recommender modules 440 that compute insights that are not statistical measures. Implementing recommenders in a modular manner allows implementations of application 300 to be configured according to the type of data stored in a dataset and available for presentation to a user. In addition, because different analyses require different amounts of time to complete and because analyses relate only to data in the dataset, recommender modules 440 generate insights asynchronously with particular user queries.

Insight management module 420 manages and stores insights generated by recommender modules 440 for evaluation for presentation to a user. Module 420 maintains insight data in a structured format, for example a nested JSON format, for ease in processing insights from different recommender modules 440.

Insight management module 420 computes interestingness scores for insights. For a recommender module that computes a statistical measure of data within the dataset, module 420 computes an interestingness score corresponding to the statistical measure, normalized to a common scale (e.g. 0 to 1) for comparison with other insights from other recommender modules. For a recommender modules that computes other than statistical measures, module 420 computes an interestingness score appropriate to the recommender module's analysis.

Insight selection module 430 selects one or more insights for evaluation for presentation to a user during a conversation. To select insights, module 430 scores insights according to one or more of their relevance and timeliness, and combines one or more of an insight's interestingness, relevance, and timeliness scores into a composite insight score. Module 430 uses an insight's composite score to select one or more insights for presentation to a user, as recommendations for analyses a user might be interested in pursuing. One implementation of module 430 ranks all scored insights, and selects a predetermined number of the top-ranked insights for presentation. Another implementation of module 430 ranks all the insights with scores above a predetermined threshold score and selects a predetermined number of the top-ranked insights for presentation. Another implementation of module 430 adjusts the number of insights to be presented according to a configuration setting. Another implementation of module 430 adjusts the number of insights to be presented according to a stage of the user's interaction (e.g. more insights early in the user's interaction and fewer insights later in the user's interaction when the user is assumed to be more familiar with the dataset and available analyses). Another implementation of module 430 adjusts the number of insights to be presented according to feedback from the user (e.g. show more insights if the user selects one or more of the insights for further analysis, show fewer insights if the user ignores the insights or asks the system to stop showing insights).

Trigger module 410 triggers updates to insight generation when a portion of data in the dataset is updated, or when the size or frequency of dataset updates is above a threshold side or frequency. Some data updates can affect different insights differently. As a result, another implementation of module 410 triggers updates to insight generation using different thresholds for different recommender modules.

Trigger module 410 also triggers updates to insight generation when the current conversational context has below a threshold similarity with a previous conversational context. One implementation of module 410 triggers updates to insight generation using different thresholds for different recommender modules.

Figure 5:
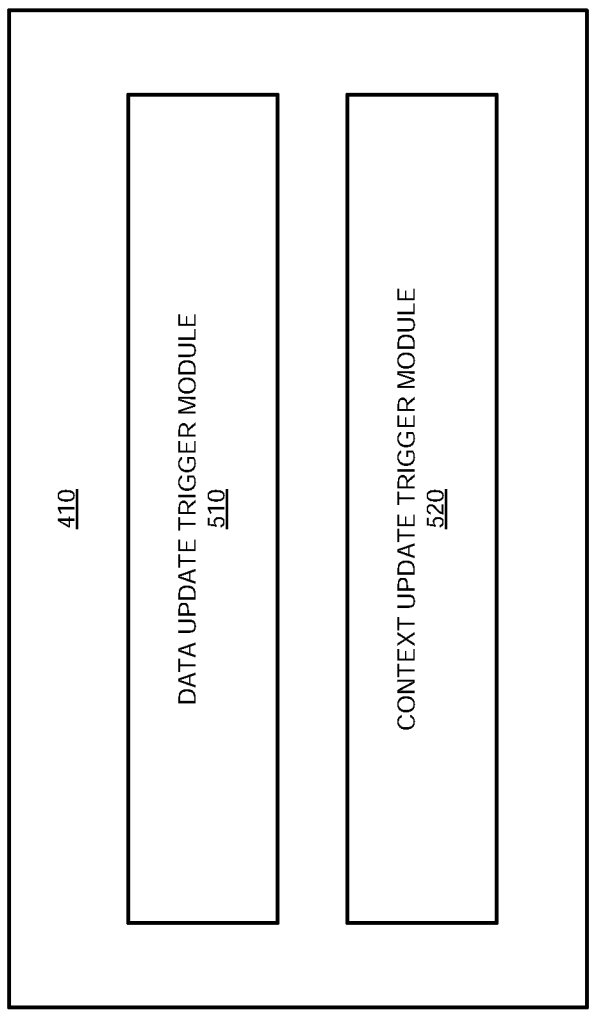
FIG. 5 depicts a block diagram of an example configuration for conversation based data analysis recommendations in accordance with an illustrative embodiment.

With reference to FIG. 5, this figure depicts a block diagram of an example configuration for conversation based data analysis recommendations in accordance with an illustrative embodiment. In particular, FIG. 5 depicts more detail of trigger module 410 in FIG. 4.

Data update trigger module 510 triggers updates to insight generation when a portion of data in the dataset is updated. One implementation of module 510 triggers updates to insight generation when the size or frequency of dataset updates is above a threshold side or frequency. Some data updates can affect different insights differently. As a result, another implementation of module 510 triggers updates to insight generation using different thresholds for different recommender modules.

Context update trigger module 520 generates insights using a subset of relevant data within a dataset, by triggering updates to insight generation when the current conversational context has below a threshold similarity with a previous conversational context. One implementation of module 520 triggers updates to insight generation using different thresholds for different recommender modules.

Figure 6:
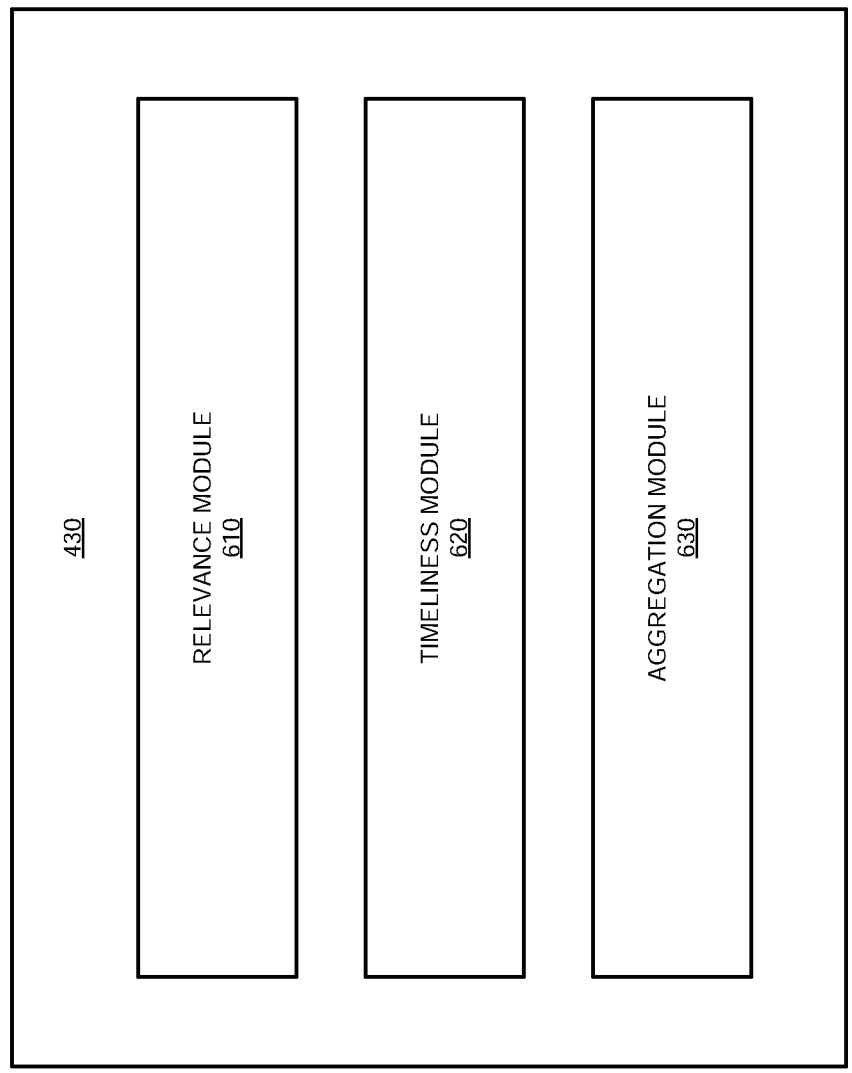
FIG. 6 depicts a block diagram of an example configuration for conversation based data analysis recommendations in accordance with an illustrative embodiment.

With reference to FIG. 6, this figure depicts a block diagram of an example configuration for conversation based data analysis recommendations in accordance with an illustrative embodiment. In particular, FIG. 6 depicts more detail of insight selection module 430 in FIG. 4.

Relevance module 610 computes a relevance score for an insight by comparing an insight to the current conversational context. To facilitate comparing an insight to the current conversational context, module 610 encodes both insight and context using a format such as a vector representation.

One implementation of module 610 computes vector representations of vocabulary terms used in either insight or context. Insight and context are encoded using the same format or encoding scheme, in which contexts and insights with similar attributes are represented by vectors that close together in the vector space, while contexts and insights with less similar attributes are represented by vectors that are further apart in the vector space. The vector format of the encoding scheme is also configurable to prioritize some attributes over others.

In one encoding scheme, if a particular field value has an equivalent meaning in both an insight and a context, the field value is encoded in the same vector dimension. In cases in which a particular field value does not have an equivalent meaning in both an insight and a context, linkages between field values can also be implemented in the encoding by assigning linked field values to a common vector dimension. Multiple field values can also be implemented in the encoding in a similar manner to encode one-to-many linkages between field values.

Another implementation of module 610 uses a machine learning model to compute vector representations of insights and contexts. The machine learning model is trained to compute vector representations using a set of training data, for example training data in which an insight and a context are labelled as similar to or different from each other.

To compute a relevance score, module 610 computes a similarity measure between an encoded version of a context and an encoded version of an insight. In one implementation of module 610 in which both context and insight are encoded into vector representations, the similarity measure is cosine similarity between the two vector representations.

Timeliness module 620 computes a timeliness score for an insight. Computing a timeliness score that decreases as an interaction with a user proceeds avoids showing a user the same insights at every turn in a conversation, even if the insights remain sufficiently relevant and interesting. One implementation of module 620 computes a timeliness score of an insight by computing 1−frequency(I)/current timestep, where frequency(I) represents the frequency with which an insight I was shown to a user in previous conversational turns and the current timestep represents the current conversational turn.

Aggregation module 630 combines one or more of an insight's interestingness, relevance, and timeliness scores into a composite insight score. One implementation of module 630 computes a weighted average of the interestingness, relevance, and timeliness scores. In one implementation of module 630, the weights of each score are constant. In another implementation of module 630, the weights of each score are adjusted as an interaction with a user progresses. For example, when a user is at a beginning analysis stage and might be interested in exploring different aspects of the data in a dataset, the interestingness of an insight might be prioritized over relevance by weighting an insight's interestingness score higher than the insight's relevance score. As another example, when a user is at a later analysis stage and might be interested in analyzing specific data, the relevance of an insight might be prioritized over interestingness by weighting an insight's relevance score higher than the insight's interestingness score.

Figure 7:
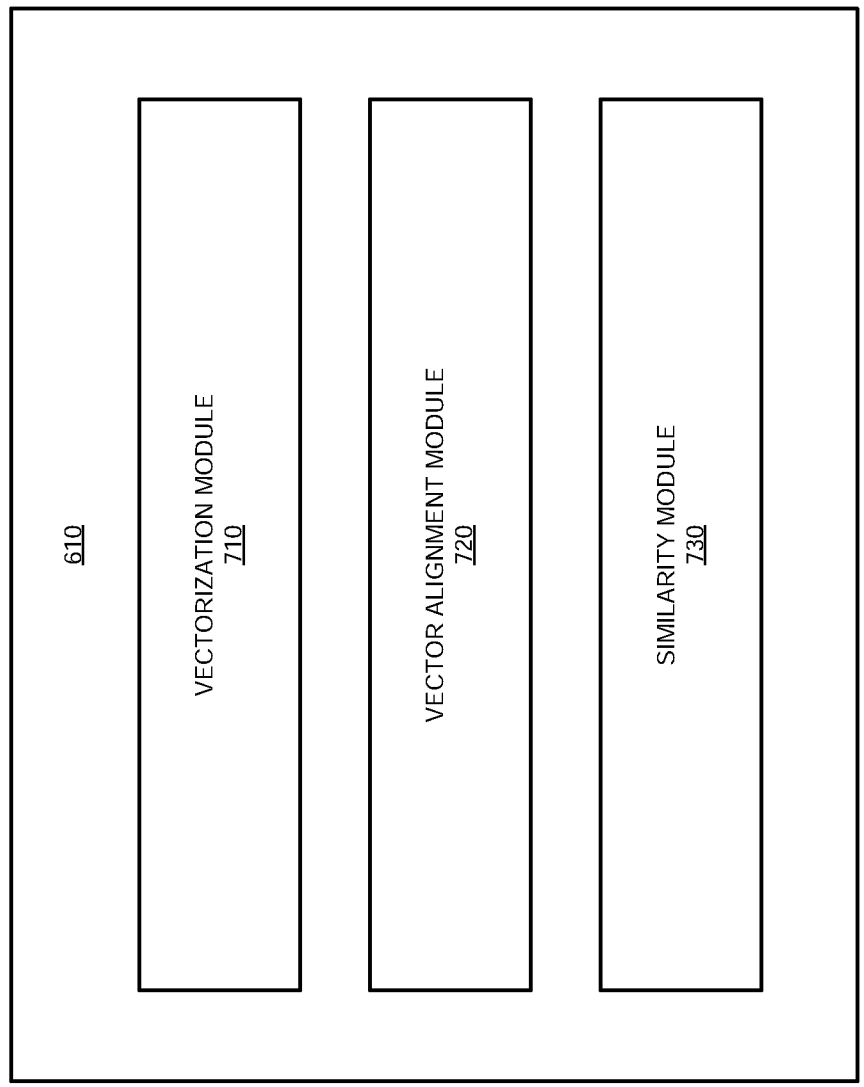
FIG. 7 depicts a block diagram of an example configuration for conversation based data analysis recommendations in accordance with an illustrative embodiment.

With reference to FIG. 7, this figure depicts a block diagram of an example configuration for conversation based data analysis recommendations in accordance with an illustrative embodiment. In particular, FIG. 7 depicts more detail of relevance module 610 in FIG. 6.

Vectorization module 710 encodes, into vector representations, vocabulary terms used in either insight or context. Each vocabulary term is a combination of a field (e.g. a task or a data attribute) and available options for values of that field (e.g. aggregation or correlation for task and profit or sales for a data attribute). One implementation of module 710 uses a one-hot encoding scheme, in which every option of a field is represented by a dimension of a vector. To encode a particular value of a field, the dimension corresponding to that value is set to a particular value (e.g., one) and the dimensions corresponding to other possible values are set to zero. Thus, for example, if a field denoting the stage of a user's data exploration has three possible values, early, middle, and late, to encode a value of early the dimension corresponding to early is set to one and the dimensions corresponding to middle and late are set to zero.

Vector alignment module 720 ensures that insight and context are encoded using a common format or encoding scheme, in which if a particular field value has an equivalent meaning in both an insight and a context, the field value is encoded in the same vector dimension. For example, if unit_cost is a possible value of the attribute field, then both an insight and a context that include the unit_cost value for the attribute field will have a one in the same vector dimension.

Similarity module 730 accounts for cases in which a particular field value does not have an equivalent meaning in both an insight and a context, by implementing linkages between field values in the encoding by assigning linked field values to the same vector dimension. For example, to present easy to understand insights to a user in an early stage of data exploration, the context term stage_early is assigned a common vector dimension with the insight term difficulty_level_easy. Multiple field values can also be implemented in the encoding in a similar manner to encode one-to-many linkages between field values.

In one implementation of modules 720 and 730, a subject matter expert determines which field values have equivalent meanings and which field values should be linked in a system configuration process. In one implementation of module 710, each field value is equally weighted by setting each corresponding dimension's value to either one or zero. In another implementation of module 710, varying importance of particular fields and field values are denoted by setting each corresponding dimension's value one or zero as well as other values. For example, if the attribute field is to be given more weight than other fields, vector dimensions corresponding to values for the attribute field might be set to two, while vector dimensions corresponding to values for other fields might be set to one.

With reference to FIG. 8, this figure depicts a block diagram of an example configuration for conversation based data analysis recommendations in accordance with an illustrative embodiment. In particular, FIG. 8 depicts more detail of one implementation of recommender modules 440 in FIG. 4.

Deviation module 810 computes deviations of some types of data from other types of data and reports as insights deviations that are above a threshold deviation. Correlation module 820 iterates through pairs of types of data (representing possible scatterplots that can be generated from the data), then computes a correlation measure between pairs. A correlation measure that is higher than a threshold amount is reported as an insight. Outlier module 830 computes outlier data points as insights. Skewness module 840 computes skewness (the asymmetry of a probability distribution about a mean) and reports skewness above a threshold value as an insight. Variance module 850 computes variance (the squared deviation of a random variable from its mean) and reports variance above a threshold value as an insight. Monotonicity module 860 reports types of data that increase or decrease together. Other implementation of recommender modules 440 include recommender modules that compute different statistical insights and recommender modules that compute insights that are not statistical measures.

Figure 9:
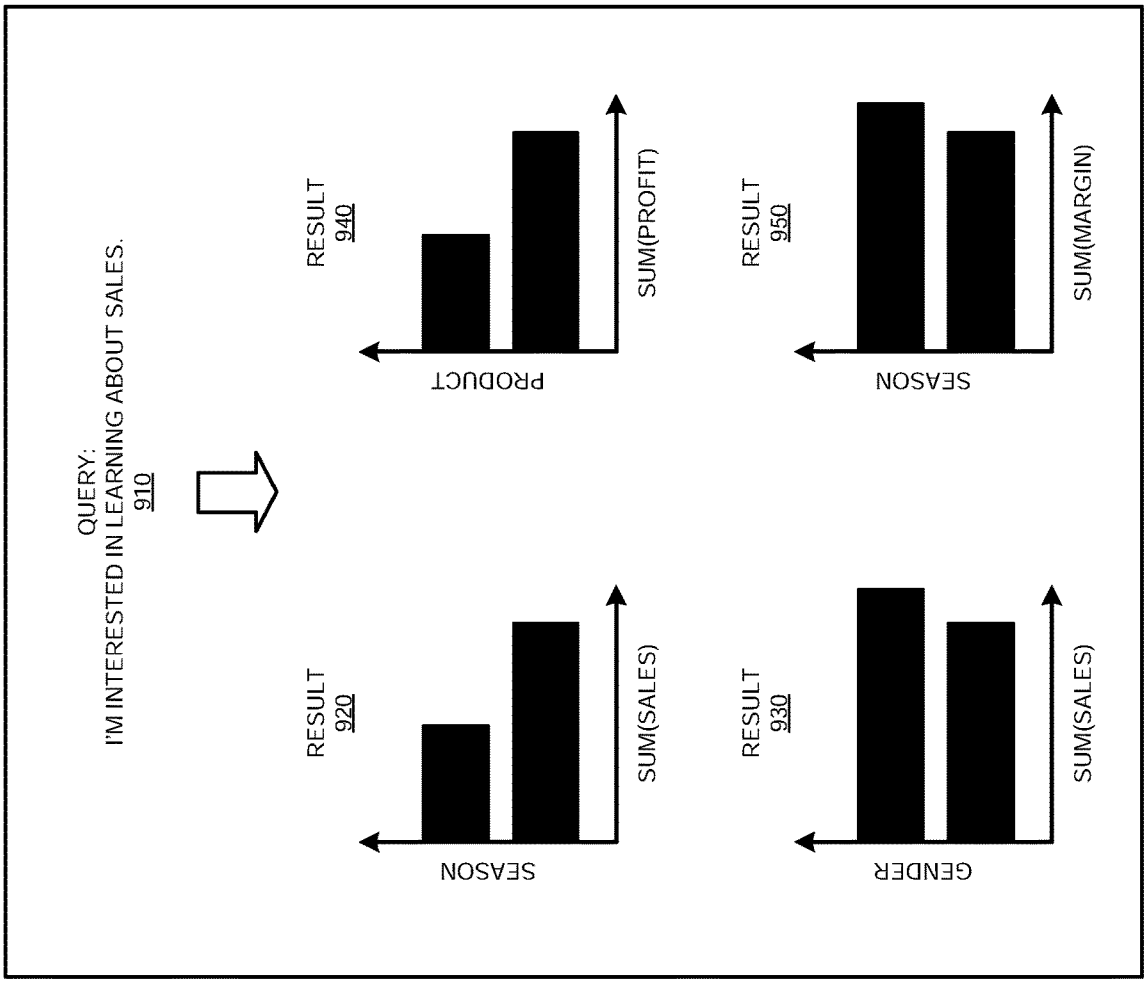
FIG. 9 depicts an example of conversation based data analysis recommendations in accordance with an illustrative embodiment.

With reference to FIG. 9, this figure depicts an example of conversation based data analysis recommendations in accordance with an illustrative embodiment. The example can be executed using application 300 in FIG. 3.

As depicted, query 910 references sales data. Thus, results 920 and 930, which depict analyses involving sales data, are more relevant to the current context than results 940 and 950, which depict analyses involving profit and margin data rather than sales data.

Figure 10:
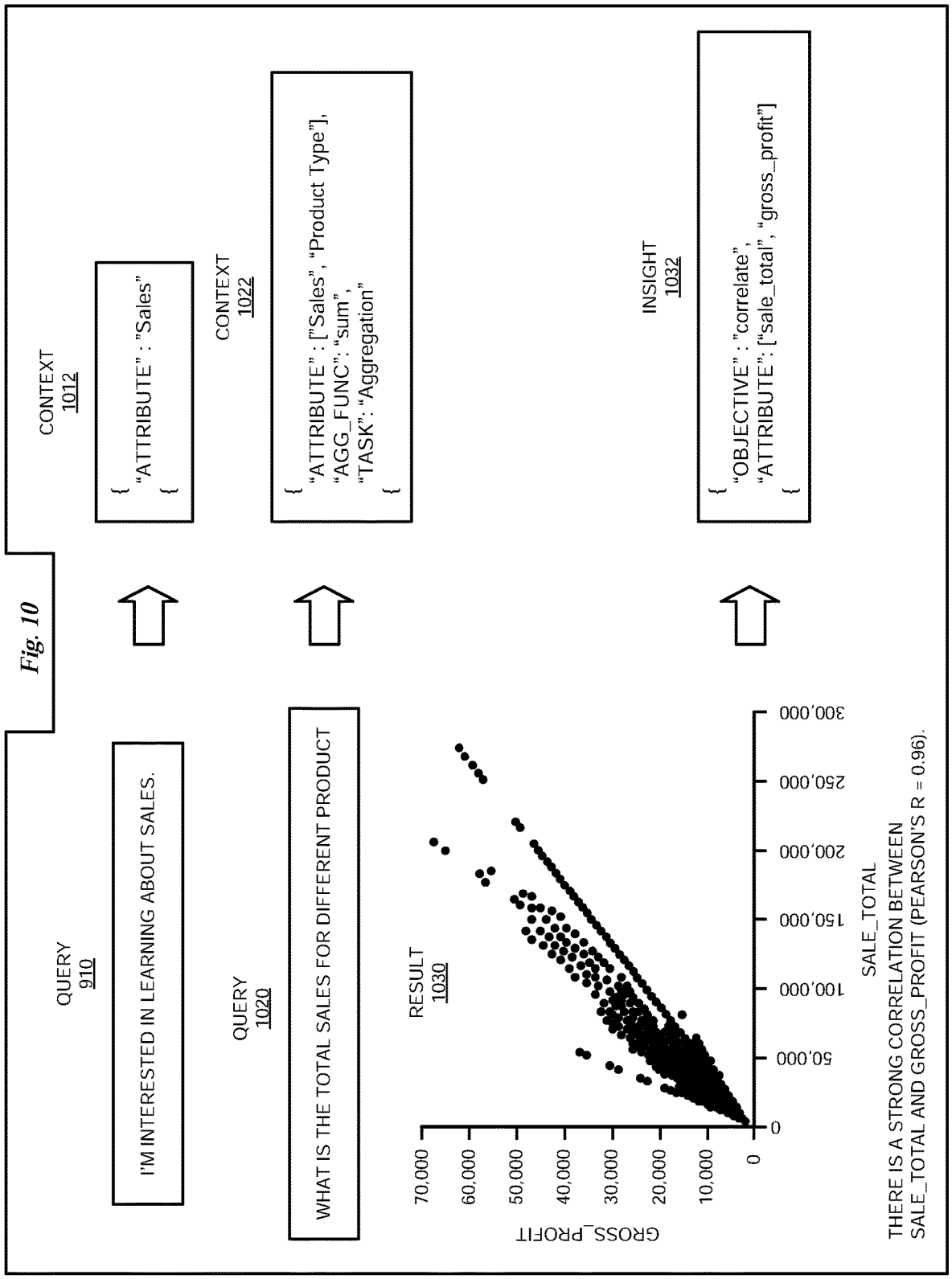
FIG. 10 depicts a continued example of conversation based data analysis recommendations in accordance with an illustrative embodiment.

With reference to FIG. 10, this figure depicts a continued example of conversation based data analysis recommendations in accordance with an illustrative embodiment. Query 910 is the same as query 910 in FIG. 9.

In particular, FIG. 10 depicts conversion of both insight and context data into the same JSON-based structured format. Thus, application 300 analyzes query 910 generating context 1012, and analyzes query 1020 generating context 1022. Application 300 also maintains data of result 1030 as insight 1032.

Figure 11:
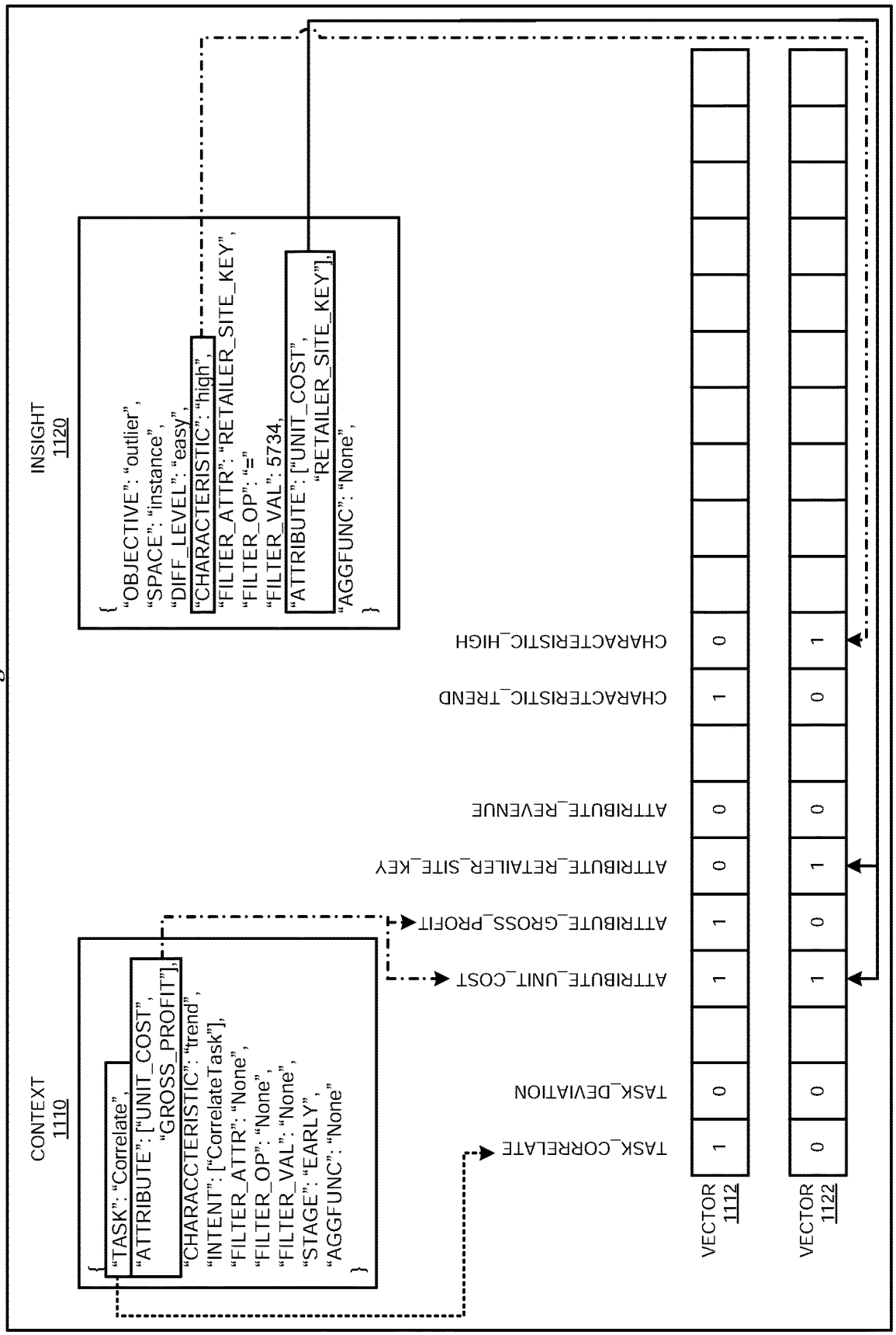
FIG. 11 depicts an example of conversation based data analysis recommendations in accordance with an illustrative embodiment.

With reference to FIG. 11, this figure depicts an example of conversation based data analysis recommendations in accordance with an illustrative embodiment. The example can be executed using application 300 in FIG. 3.

As depicted, context 1110, in a JSON-based structured format, is being encoded into vector 1112. Insight 1120, also in a JSON-based structured format, is being encoded into vector 1122.

The encoding scheme depicted encodes vocabulary terms used in either insight or context. Each vocabulary term is a combination of a field and available options for values of that field. The scheme is a one-hot encoding scheme, in which every option of a field is represented by a dimension of a vector. To encode a particular value of a field, the dimension corresponding to that value is set to a particular value (e.g., one) and the dimensions corresponding to other possible values are set to zero.

Thus, because the available options for the task field are correlate and deviation, and context 1110 specifies the correlate option, vector 1112 includes a 1 in the task_correlate field and a 0 in the task_deviation field. Because insight 1120 does not specify a task, both the task_correlate and task_deviation fields in vector 1122 are set to 0. Similarly, there are four available options for the attribute field: unit_cost, gross_profit, retailer_site_key, and revenue. Context 1110 specifies the unit_cost and gross_profit values for attribute, so the corresponding fields in vector 1112 are set to 1. Insight 1120 specifies the unit_cost and retailer_site_key values for attribute, so the corresponding fields in vector 1122 are set to 1, and unspecified values for t (e.g. aggregation or correlation for task and profit or sales for a data attribute). Similarly, because the available options for the characteristic field are trend and high, and context 1110 specifies the trend option, vector 1112 includes a 1 in the characteristic_trend field and a 0 in the characteristic_high field. Because insight 1120 specifies the high option, vector 1122 includes a 1 in the characteristic_high field and a 0 in the characteristic_trend field. Note that insight 1120 and context 1110 are encoded using the same format or encoding scheme, in which if a particular field value has an equivalent meaning in both an insight and a context (e.g. the attribute and characteristic fields), the field value is encoded in the same vector dimension.

Figure 12:
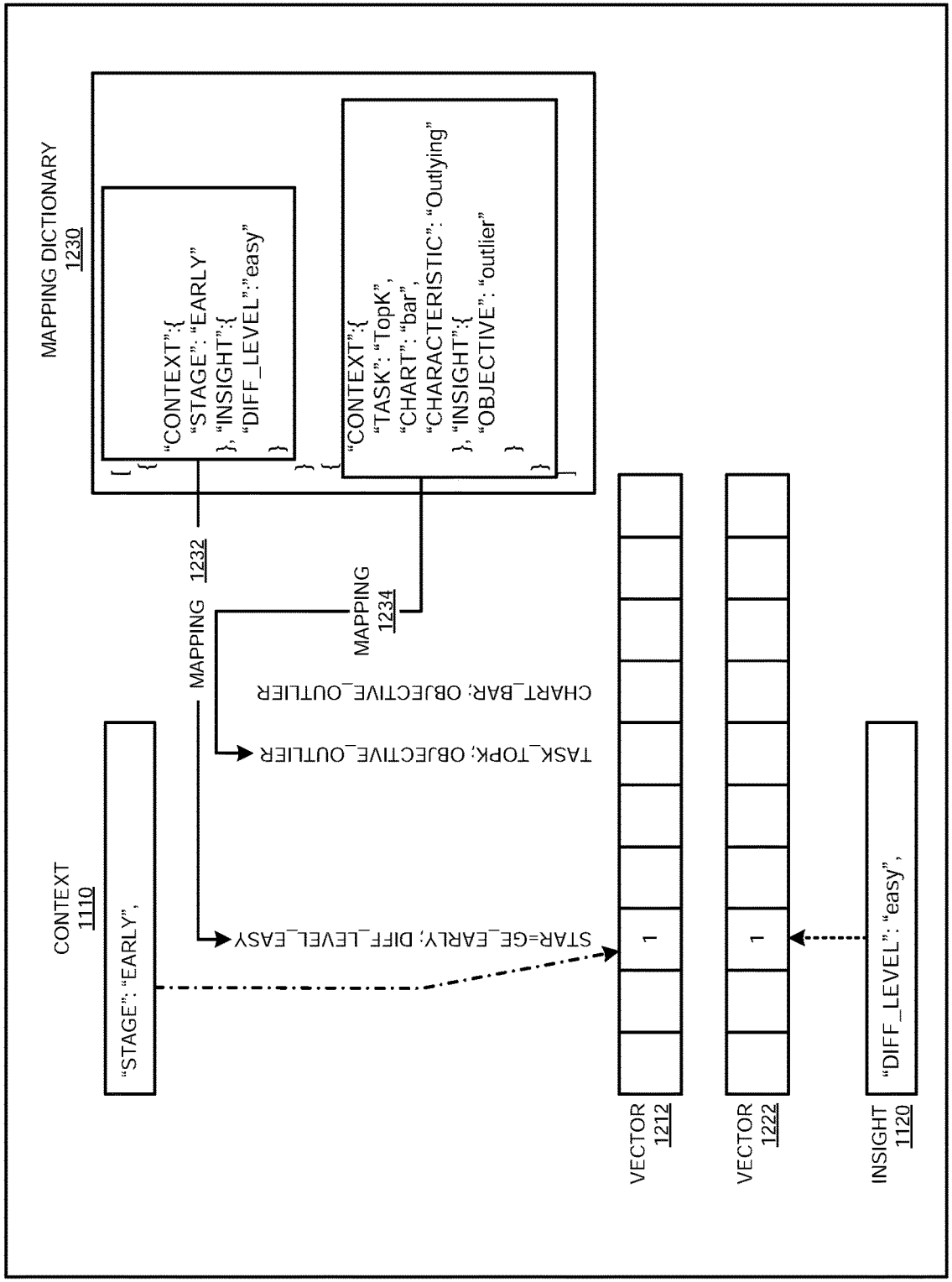
FIG. 12 depicts a continued example of conversation based data analysis recommendations in accordance with an illustrative embodiment.

With reference to FIG. 12, this figure depicts a continued example of conversation based data analysis recommendations in accordance with an illustrative embodiment. Context 1110 and insight 1120 are the same as context 1110 and insight 1120 in FIG. 11, although only portions of context 1110 and insight 1120 are depicted here.

Vector 1212 is a portion of a vector representation of context 1110. Vector 1222 is a portion of a vector representation of insight 1120. Mapping dictionary 1230 stores, in a JSON-based structured format, linkages between field values. Linked field values are implemented in the encoding for vectors 1212 and 1222 by assigning linked field values to the same vector dimension. Thus, mapping 1232 depicts the context term stage_early assigned to a common vector dimension with the insight term difficulty_level_easy. Mapping 1234 depicts the context term task_topK assigned to a common vector dimension with the insight term objective_outlier, and the context term chart_bar also assigned to a common vector dimension with the insight term objective_outlier.

Figure 13:
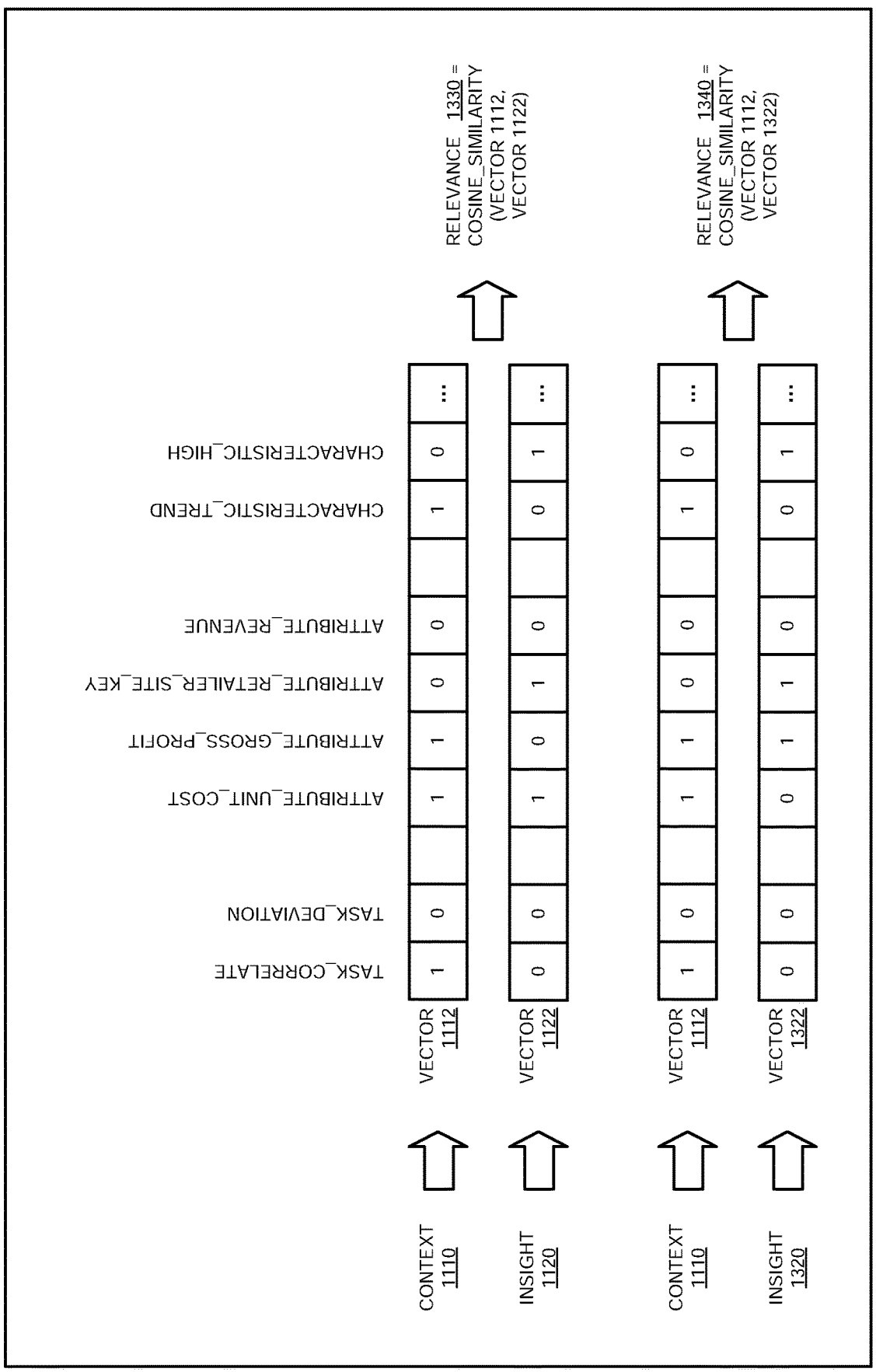
FIG. 13 depicts a continued example of conversation based data analysis recommendations in accordance with an illustrative embodiment.

With reference to FIG. 13, this figure depicts a continued example of conversation based data analysis recommendations in accordance with an illustrative embodiment. Context 1110, vector 1112, insight 1120, and vector 1122 are the same as context 1110, vector 1112, insight 1120, and vector 1122 in FIG. 11.

As depicted, context 1110 is represented by vector 1112. Insight 1120 is represented by vector 1122, and insight 1320 is represented by vector 1322. To compute relevance 1330 for insight 1120, application 300 computes a similarity measure, here cosine similarity, between vector 1112 and vector 1122. To compute relevance 1340 for insight 1320, application 300 computes cosine similarity between vector 1112 and vector 1322.

Figure 14:
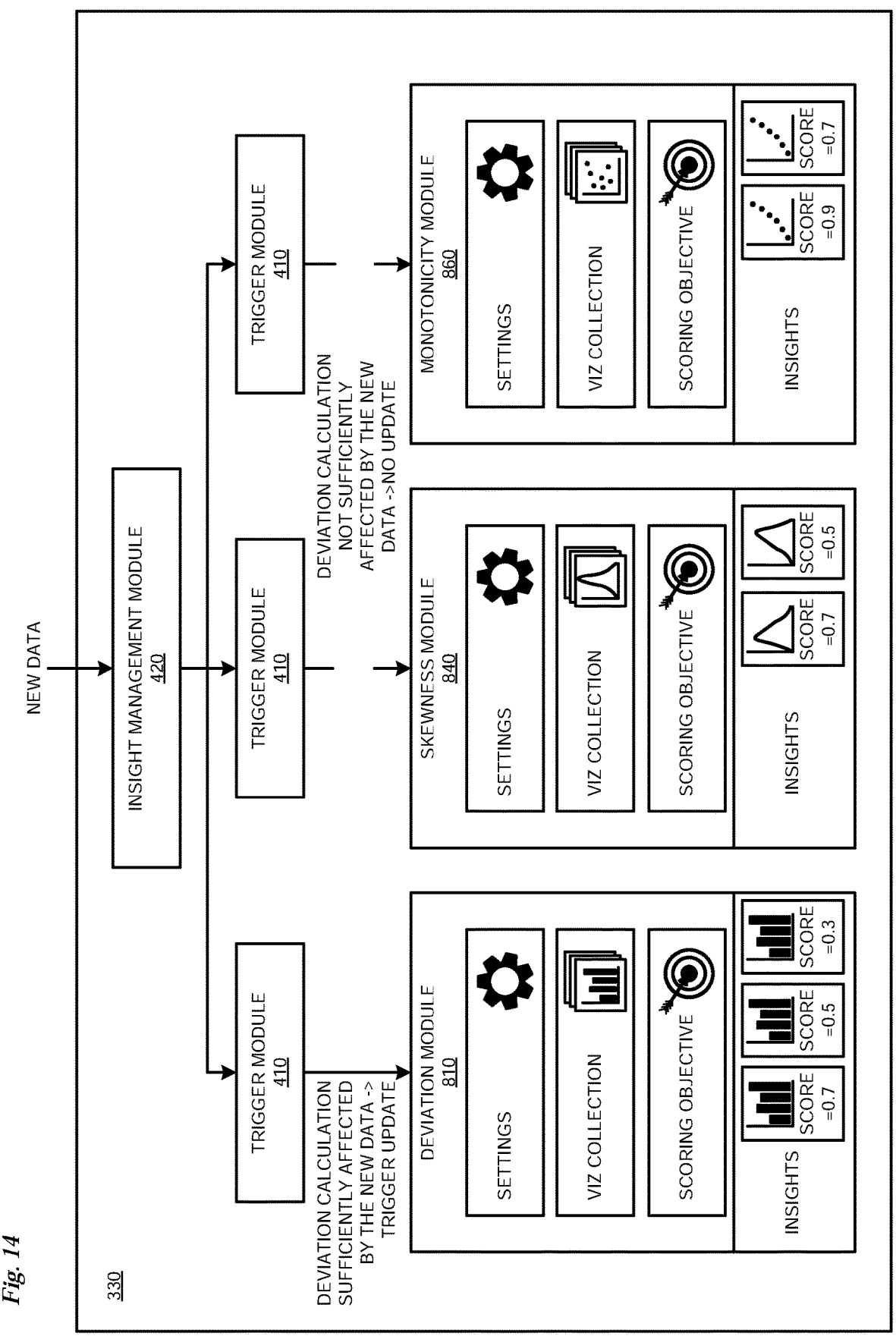
FIG. 14 depicts an example of conversation based data analysis recommendations in accordance with an illustrative embodiment.

With reference to FIG. 14, this figure depicts an example of conversation based data analysis recommendations in accordance with an illustrative embodiment. The example can be executed using application 300 in FIG. 3. Insight management module 420 and trigger module 410 are the same as insight management module 420 and trigger module 410 in FIG. 4. Deviation module 810, skewness module 840, and monotonicity module 860 are the same as deviation module 810, skewness module 840, and monotonicity module 860 in FIG. 8.

As depicted, module 420 has determined that new data will affect the deviation calculation by more than a threshold amount. Thus, trigger module 410 triggers deviation module 810 to update insight generation based on the new data. However, module 420 has determined that new data will not affect the skewness and monotonicity calculations by more than a threshold amount. Thus, trigger module 410 does not trigger skewness module 810 or monotonicity module 860 to update insight generation based on the new data.

Figure 15:
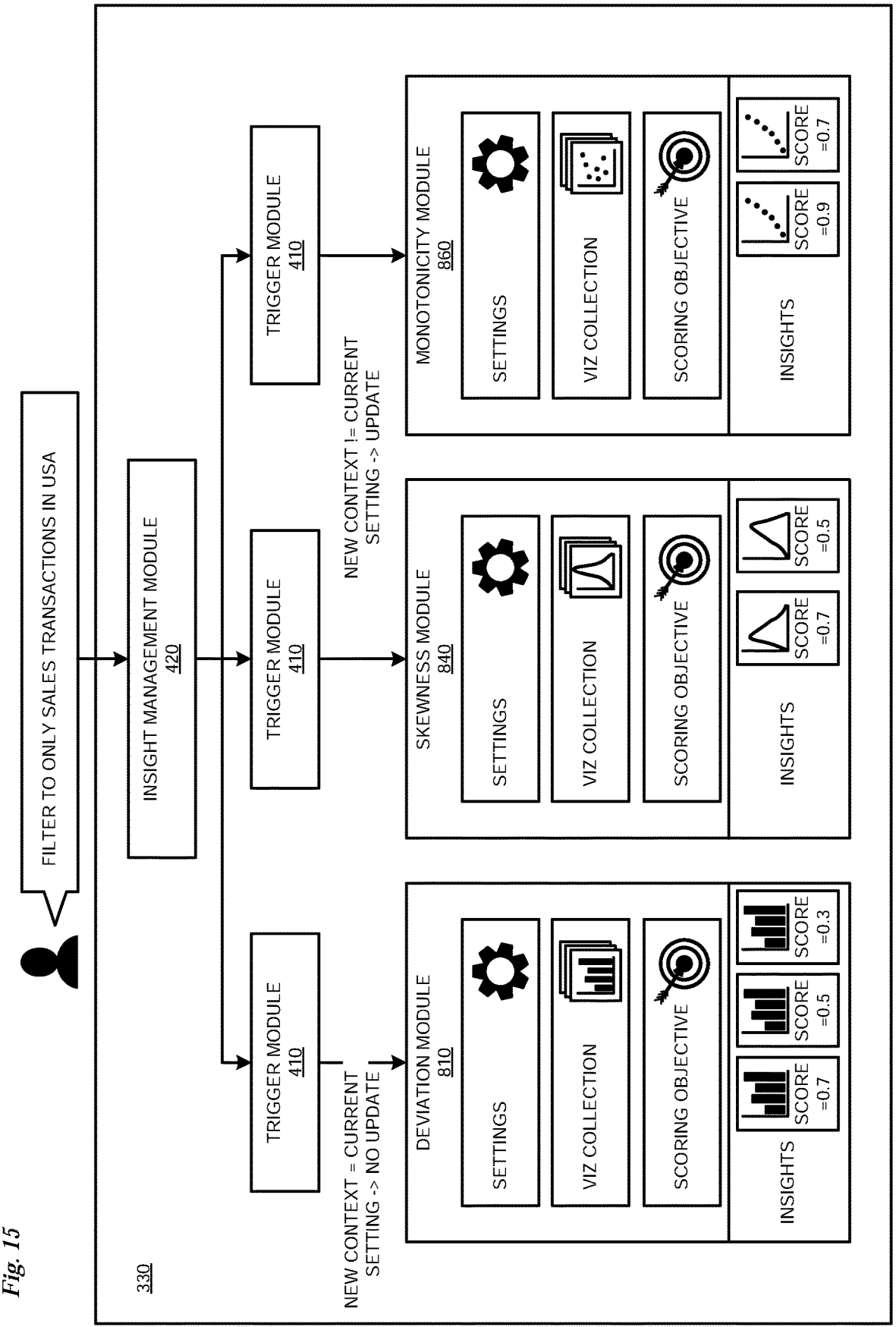
FIG. 15 depicts an example of conversation based data analysis recommendations in accordance with an illustrative embodiment.

With reference to FIG. 15, this figure depicts an example of conversation based data analysis recommendations in accordance with an illustrative embodiment. The example can be executed using application 300 in FIG. 3. Insight management module 420 and trigger module 410 are the same as insight management module 420 and trigger module 410 in FIG. 4. Deviation module 810, skewness module 840, and monotonicity module 860 are the same as deviation module 810, skewness module 840, and monotonicity module 860 in FIG. 8.

As depicted, module 420 has determined that a portion of the context has changed because the user has requested filtering only to US sales transactions. The context change does not affect the deviation calculation, so trigger module 410 does not trigger deviation module 810 to update insight generation based on the new context. However, module 420 has determined that the context change does affect the skewness and monotonicity calculations by more than a threshold amount. Thus, trigger module 410 triggers skewness module 810 and monotonicity module 860 to update insight generation based on the new context.

Figure 16:
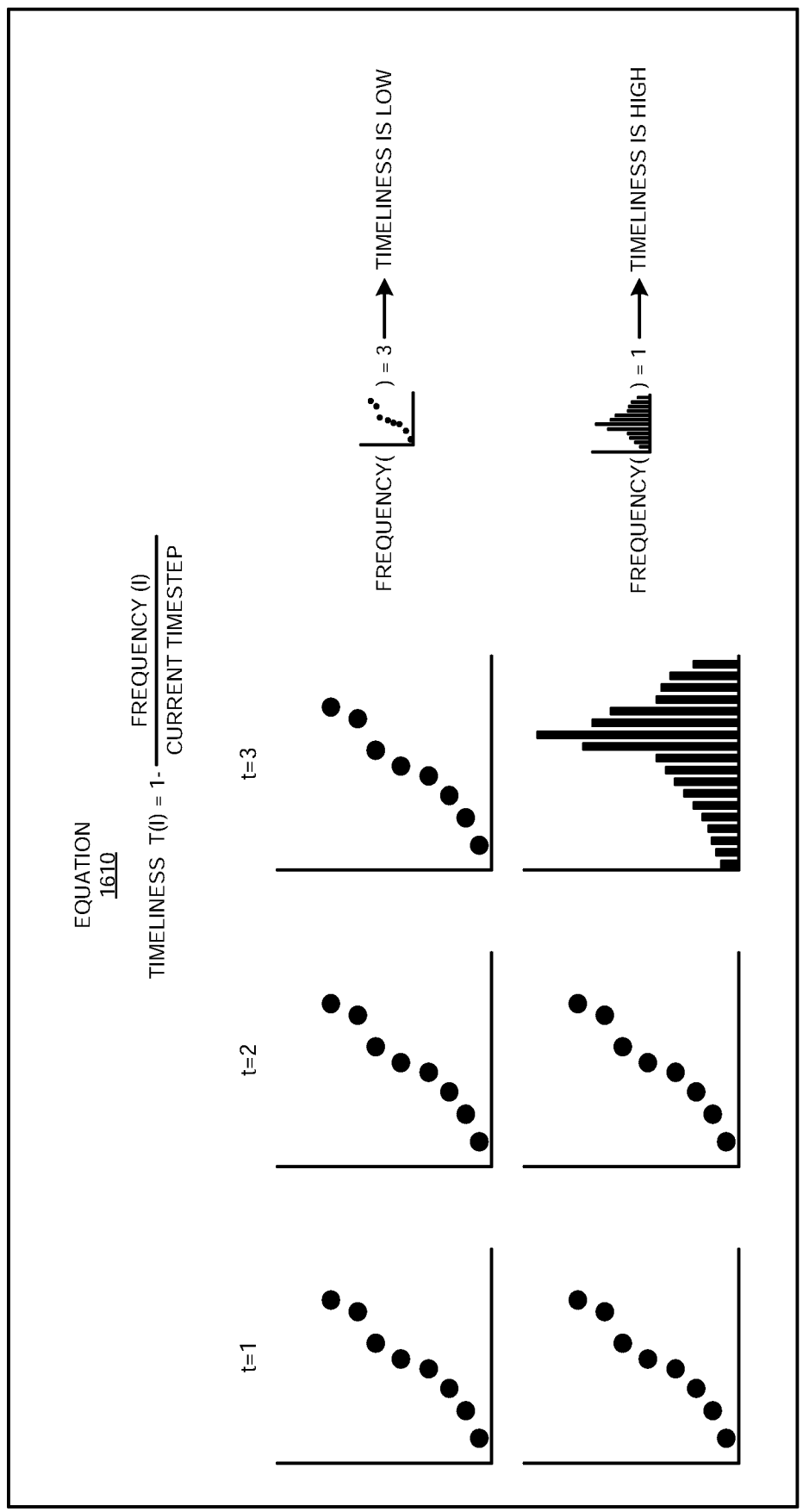
FIG. 16 depicts an example of conversation based data analysis recommendations in accordance with an illustrative embodiment.

With reference to FIG. 16, this figure depicts an example of conversation based data analysis recommendations in accordance with an illustrative embodiment. The example can be executed using application 300 in FIG. 3.

FIG. 16 depicts the use of equation 1610 to compute a timeliness score of an insight. If this is conversation turn 3, an insight that was presented to a user in the last two conversational turns has frequency(I)=3 and the corresponding timeliness score is 1−3/3=0. However, if this is conversation turn 3 and the insight was not presented in the last two conversational turns, frequency(I)=1 and the corresponding timeliness score is 1−1/3=2/3. Thus, the insight which has not been previously presented (the bar chart) has a higher timeliness score than the insight that has already been presented twice.

Figure 17:
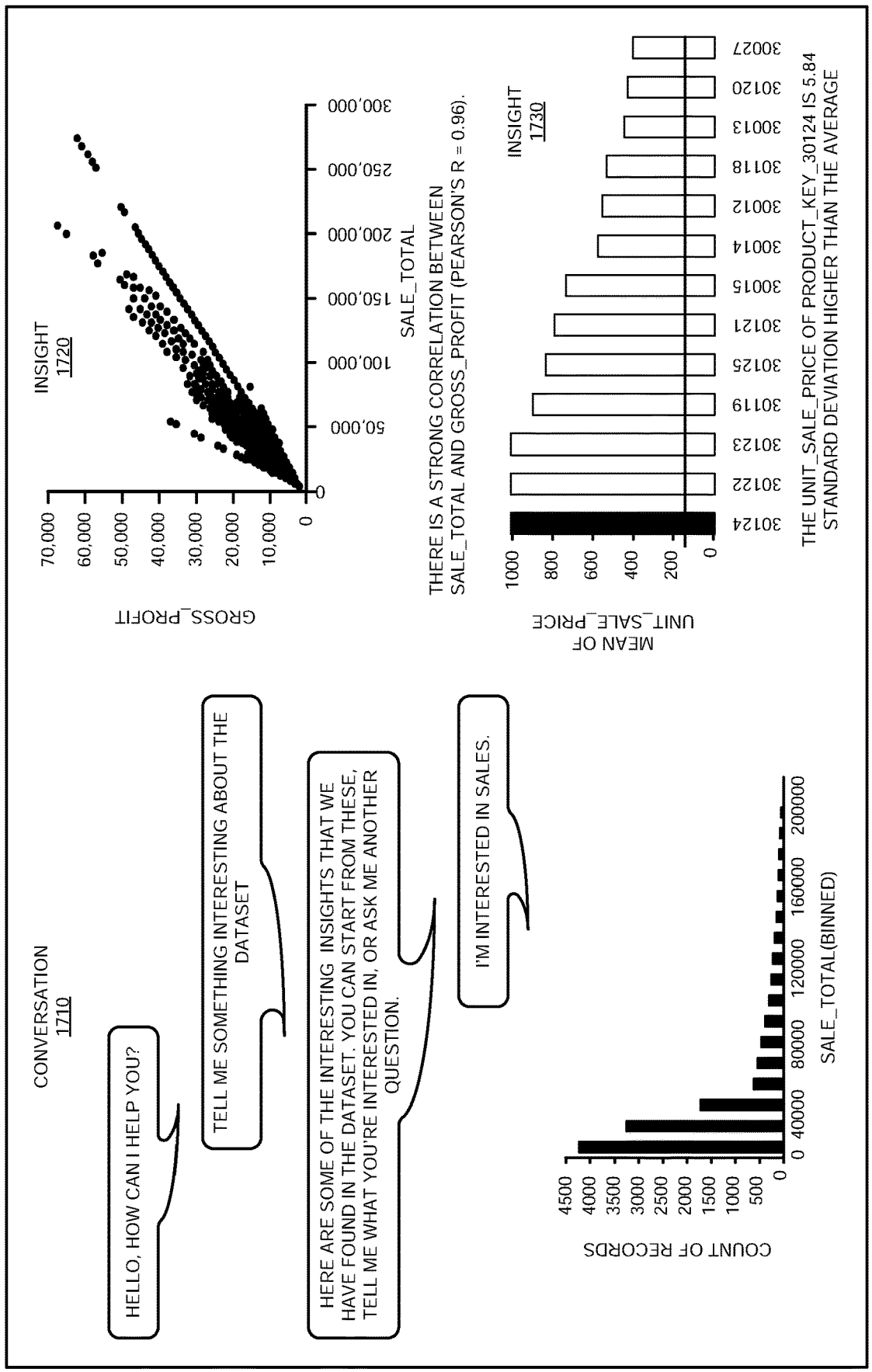
FIG. 17 depicts an example of conversation based data analysis recommendations in accordance with an illustrative embodiment.

With reference to FIG. 17, this figure depicts an example of conversation based data analysis recommendations in accordance with an illustrative embodiment. The example can be executed using application 300 in FIG. 3.

Conversation 1710 includes an interaction with a user, using a combination of natural language and data depiction, presenting the user with requested sales data. In addition, insights 1720 and 1730 have also been scored and presented to the user as recommendations for other analyses the user might find helpful.

Figure 18:
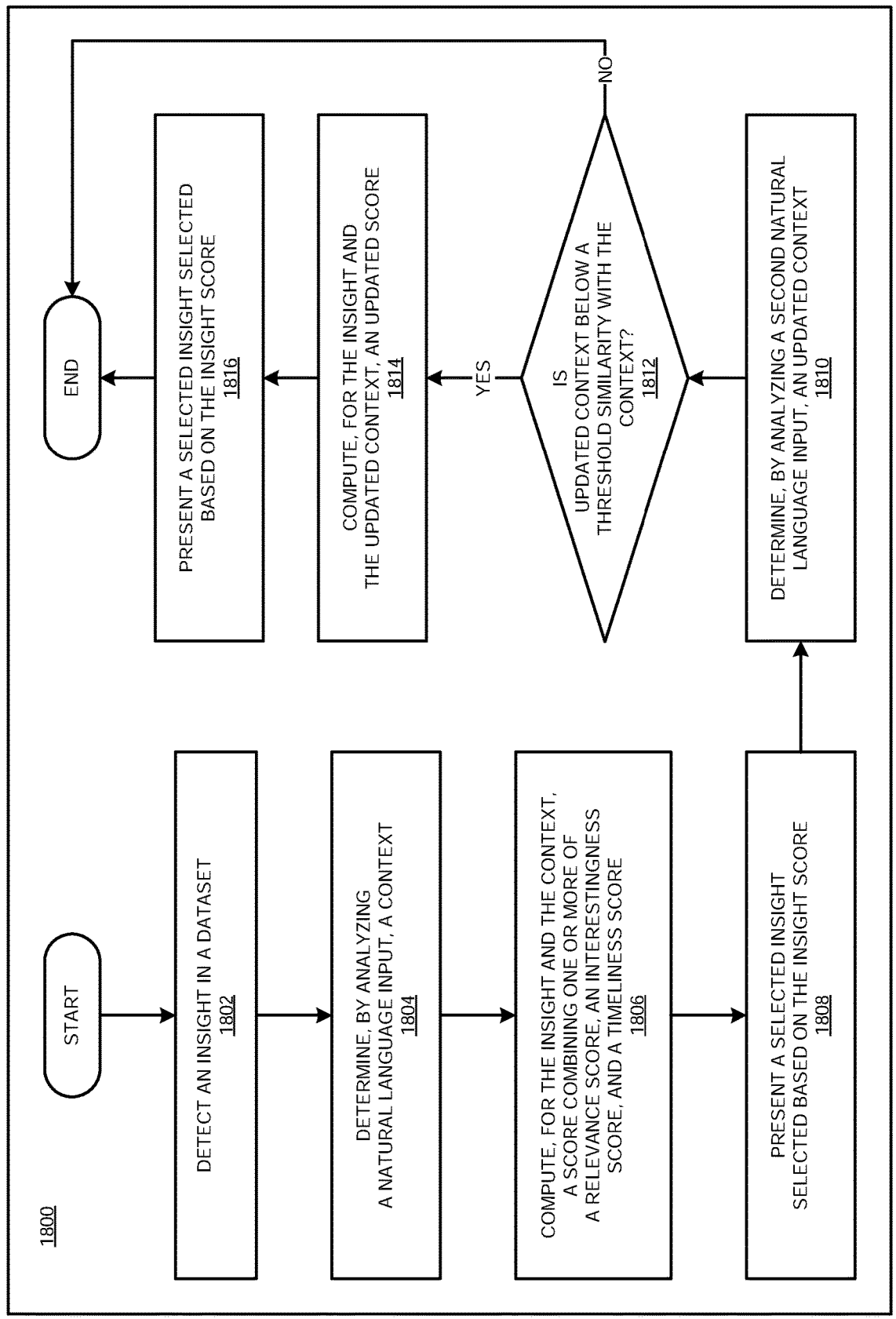
FIG. 18 depicts a flowchart of an example process for conversation based data analysis recommendations in accordance with an illustrative embodiment.

With reference to FIG. 18, this figure depicts a flowchart of an example process for conversation based data analysis recommendations in accordance with an illustrative embodiment. Process 800 can be implemented in application 300 in FIG. 3.

In block 1802, the application detects an insight in a dataset. In block 1804, the application determines a context by analyzing a natural language input. In block 18026, the application computes, for the insight and the context, a score combining one or more of a relevance score, an interestingness score, and a timeliness score. In block 1808, the application presents a selected insight selected based on the insight score. In block 1810, the application determines, by analyzing a second natural language input, an updated context. In block 1812, the application determines whether the updated context is below a threshold similarity with the original context. If yes ("YES" path of block 1812), in block 1814 the application computes an updated score for the insight and the updated context, in block 1816 the application presents a selected insight selected based on the updated insight score. Otherwise ("NO" path of block 1812), and after block 1816, the application ends.

Figure 19:
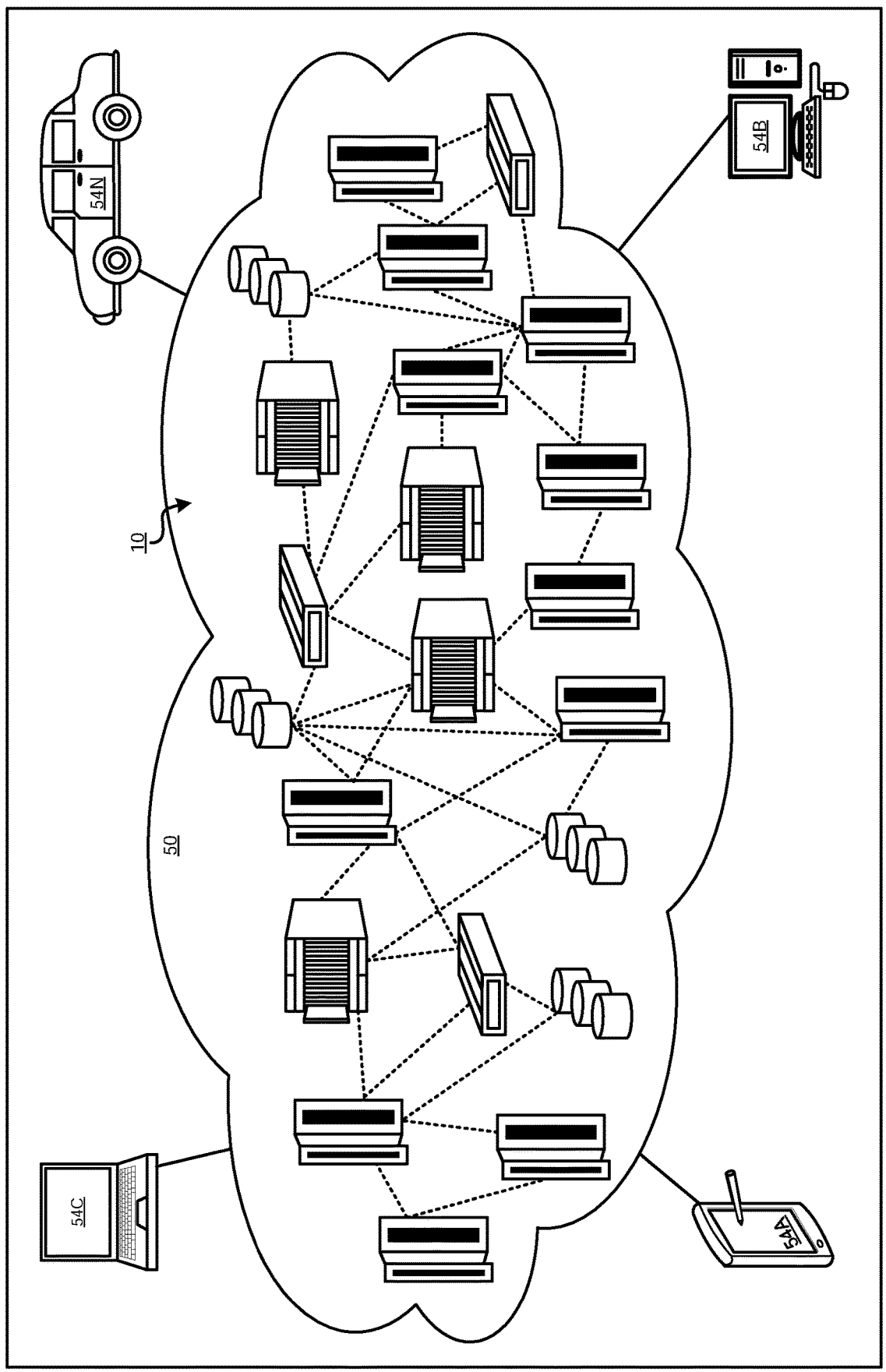
FIG. 19 depicts a cloud computing environment according to an embodiment of the present invention.

Referring now to FIG. 19, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 20:
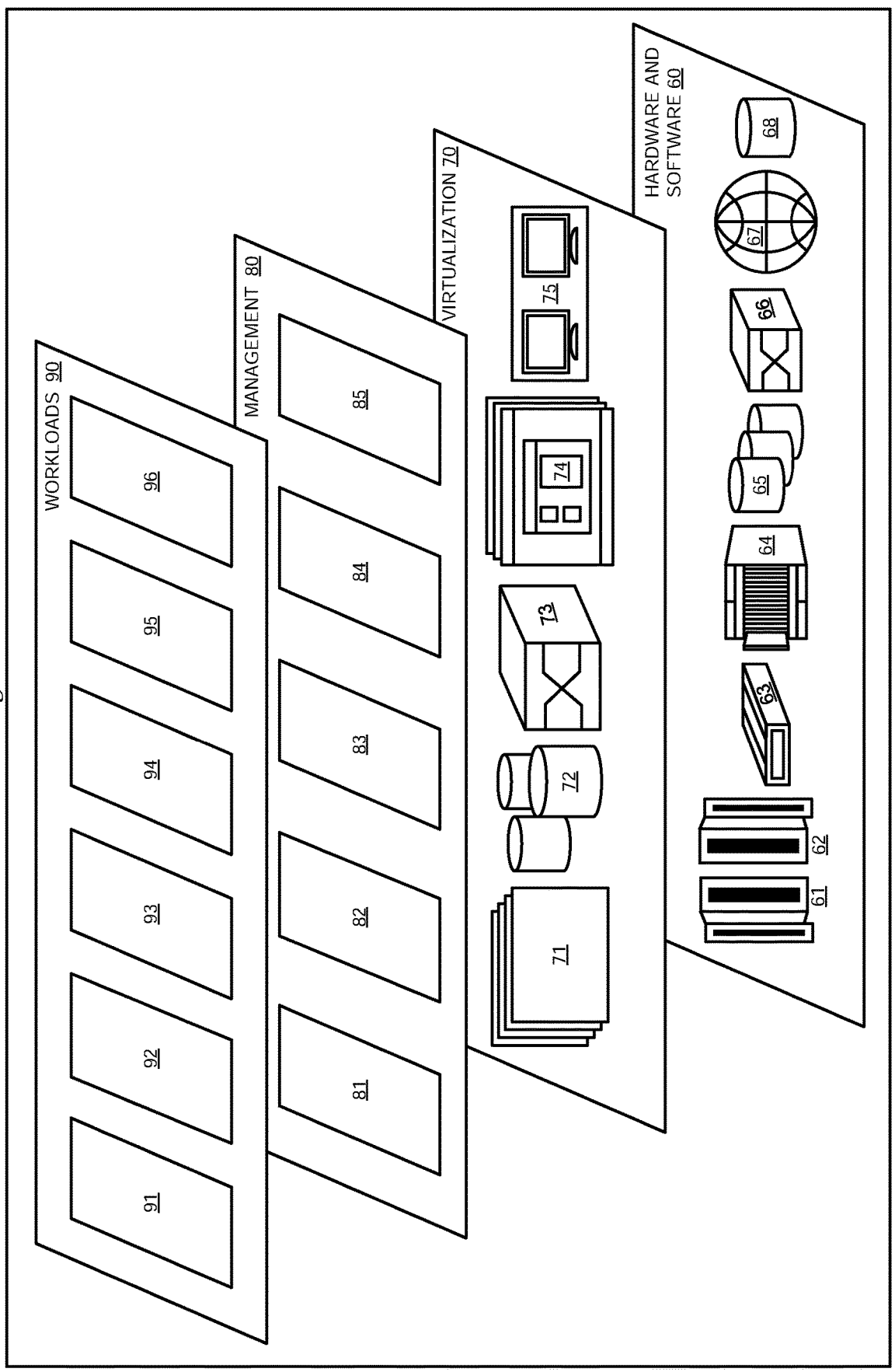
FIG. 20 depicts abstraction model layers according to an embodiment of the present invention.

Referring now to FIG. 20, a set of functional abstraction layers provided by cloud computing environment 50 (FIG. 19) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for conversation based data analysis recommendations and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A computer-implemented method comprising:
   detecting, in a dataset, an insight, the insight comprising a fact about a portion of data in the dataset, the insight maintained in a text-only structured format comprising a plurality of vocabulary terms, each vocabulary term in the plurality of vocabulary terms comprising a field and a plurality of options for values of the field;

determining, by analyzing a natural language input, a context, the context identifying an intent and an entity referenced by the natural language input, the context maintained in the text-only structured format;

computing, for the insight, a relevance score, the relevance score comprising a measure of similarity between an encoded form of the insight and an encoded form of the context, the encoded form of the insight and the encoded form of the context generated according to the same encoding scheme, the encoded form of the insight comprising an encoding of a vocabulary term used in the insight, the encoded form of the context comprising an encoding of a vocabulary term used in the context, wherein the encoding scheme is a one-hot encoding scheme in which each option in the plurality of options for values of the field is represented by a dimension of a vector; and presenting a selected insight, the selected insight selected from a set of insights including the insight, the selected insight selected based on the relevance score.

2. The computer-implemented method of claim 1, further comprising:

determining, by analyzing a second natural language input, an updated context;

detecting, responsive to determining that the updated context has below a threshold similarity with the context, a second insight;

computing, for the second insight, a second relevance score; and presenting a second selected insight, the second selected insight selected from a second set of insights including the second insight, the second selected insight selected based on the second relevance score.

3. The computer-implemented method of claim 1, further comprising:

computing, for the insight, an interestingness score;

computing, for the insight, a timeliness score; and combining, into an insight score, the interestingness score, the relevance score, and the timeliness score.

4. The computer-implemented method of claim 3, wherein the selected insight is selected based on the insight score.

5. The computer-implemented method of claim 3, wherein the insight score comprises a weighted average of the interestingness score, the relevance score, and the timeliness score.

6. The computer-implemented method of claim 1, wherein the encoding scheme encodes an attribute of the insight and an equivalent attribute of the context using the same vector dimension.

7. A computer program product for conversation based data analysis recommendation, the computer program product comprising:

one or more computer readable storage media, and program instructions collectively stored on the one or more computer readable storage media, the program instructions comprising:

program instructions to detect, in a dataset, an insight, the insight comprising a fact about a portion of data in the dataset, the insight maintained in a text-only structured format comprising a plurality of vocabulary terms, each vocabulary term in the plurality of vocabulary terms comprising a field and a plurality of options for values of the field;

program instructions to determine, by analyzing a natural language input, a context, the context identifying an intent and an entity referenced by the natural language input, the context maintained in the text-only structured format;

program instructions to compute, for the insight, a relevance score, the relevance score comprising a measure of similarity between an encoded form of the insight and an encoded form of the context, the encoded form of the insight and the encoded form of the context generated according to the same encoding scheme, the encoded form of the insight comprising an encoding of a vocabulary term used in the insight, the encoded form of the context comprising an encoding of a vocabulary term used in the context, wherein the encoding scheme is a one-hot encoding scheme in which each option in the plurality of options for values of the field is represented by a dimension of a vector; and program instructions to present a selected insight, the selected insight selected from a set of insights including the insight, the selected insight selected based on the relevance score.

8. The computer program product of claim 7, further comprising:

program instructions to determine, by analyzing a second natural language input, an updated context;

detecting, responsive to determining that the updated context has below a threshold similarity with the context, a second insight;

program instructions to compute, for the second insight, a second relevance score; and program instructions to present a second selected insight, the second selected insight selected from a second set of insights including the second insight, the second selected insight selected based on the second relevance score.

9. The computer program product of claim 7, further comprising:

program instructions to compute, for the insight, an interestingness score;

program instructions to compute, for the insight, a timeliness score; and program instructions to combine, into an insight score, the interestingness score, the relevance score, and the timeliness score.

10. The computer program product of claim 9, wherein the selected insight is selected based on the insight score.

11. The computer program product of claim 9, wherein the insight score comprises a weighted average of the interestingness score, the relevance score, and the timeliness score.

12. The computer program product of claim 7, wherein the encoding scheme encodes an attribute of the insight and an equivalent attribute of the context using the same vector dimension.

13. The computer program product of claim 7, wherein the stored program instructions are stored in the at least one of the one or more storage media of a local data processing system, and wherein the stored program instructions are transferred over a network from a remote data processing system.

14. The computer program product of claim 7, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
  program instructions to detect, in a dataset, an insight, the insight comprising a fact about a portion of data in the dataset, the insight maintained in a text-only structured format comprising a plurality of vocabulary terms, each vocabulary term in the plurality of vocabulary terms comprising a field and a plurality of options for values of the field;
  program instructions to determine, by analyzing a natural language input, a context, the context identifying an intent and an entity referenced by the natural language input, the context maintained in the text-only structured format;
  program instructions to compute, for the insight, a relevance score, the relevance score comprising a measure of similarity between an encoded form of the insight and an encoded form of the context, the encoded form of the insight and the encoded form of the context generated according to the same encoding scheme, the encoded form of the insight comprising an encoding of a vocabulary term used in the insight, the encoded form of the context comprising an encoding of a vocabulary term used in the context, wherein the encoding scheme is a one-hot encoding scheme in which each option in the plurality of options for values of the field is represented by a dimension of a vector; and
  program instructions to present a selected insight, the selected insight selected from a set of insights including the insight, the selected insight selected based on the relevance score.

17. The computer system of claim 16, further comprising:
  program instructions to determine, by analyzing a second natural language input, an updated context;
  detecting, responsive to determining that the updated context has below a threshold similarity with the context, a second insight;
  program instructions to compute, for the second insight, a second relevance score; and
  program instructions to present a second selected insight, the second selected insight selected from a second set of insights including the second insight, the second selected insight selected based on the second relevance score.

18. The computer system of claim 16, further comprising:
  program instructions to compute, for the insight, an interestingness score;
  program instructions to compute, for the insight, a timeliness score; and
  program instructions to combine, into an insight score, the interestingness score, the relevance score, and the timeliness score.

19. The computer system of claim 18, wherein the selected insight is selected based on the insight score.

20. A data processing environment comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
  program instructions to detect, in a dataset, an insight, the insight comprising a fact about a portion of data in the dataset, the insight maintained in a text-only structured format comprising a plurality of vocabulary terms, each vocabulary term in the plurality of vocabulary terms comprising a field and a plurality of options for values of the field;
  program instructions to determine, by analyzing a natural language input, a context, the context identifying an intent and an entity referenced by the natural language input, the context maintained in the text-only structured format;
  program instructions to compute, for the insight, a relevance score, the relevance score comprising a measure of similarity between an encoded form of the insight and an encoded form of the context, the encoded form of the insight and the encoded form of the context generated according to the same encoding scheme, the encoded form of the insight comprising an encoding of a vocabulary term used in the insight, the encoded form of the context comprising an encoding of a vocabulary term used in the context, wherein the encoding scheme is a one-hot encoding scheme in which each option in the plurality of options for values of the field is represented by a dimension of a vector; and
  program instructions to present a selected insight, the selected insight selected from a set of insights including the insight, the selected insight selected based on the relevance score.

21. A natural language processing system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
  program instructions to detect, in a dataset, an insight, the insight comprising a fact about a portion of data in the dataset, the insight maintained in a text-only structured format comprising a plurality of vocabulary terms, each vocabulary term in the plurality of vocabulary terms comprising a field and a plurality of options for values of the field;
  program instructions to determine, by analyzing a natural language input, a context, the context identifying an intent and an entity referenced by the natural language input, the context maintained in the text-only structured format;
  program instructions to compute, for the insight, a relevance score, the relevance score comprising a measure of similarity between an encoded form of the insight and an encoded form of the context, the encoded form of the insight and the encoded form of the context generated according to the same encoding scheme, the encoded form of the insight comprising an encoding of a vocabulary term used in the insight, the encoded form of the context comprising an encoding of a vocabulary term used in the context, wherein the encoding scheme is a one-hot encoding scheme in which each option in the plurality of options for values of the field is represented by a dimension of a vector; and
  program instructions to present a selected insight, the selected insight selected from a set of insights including the insight, the selected insight selected based on the relevance score.

* * * * *